(12) United States Patent
Bennati et al.

(10) Patent No.: US 11,921,890 B2
(45) Date of Patent: Mar. 5, 2024

(54) METHOD AND APPARATUS FOR TRAJECTORY ANONYMIZATION BASED ON A TRAJECTORY EXCHANGE TWIST

(71) Applicant: HERE Global B.V., Eindhoven (NL)

(72) Inventors: Stefano Bennati, Zürich (CH); Aleksandra Kovacevic, Wettswil (CH); Kai Pöthkow, Berlin (DE); Elena Mumford, Eindhoven (NL); Elena Vidyakina, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 457 days.

(21) Appl. No.: 17/114,121

(22) Filed: Dec. 7, 2020

(65) Prior Publication Data
US 2021/0383022 A1    Dec. 9, 2021

Related U.S. Application Data

(60) Provisional application No. 63/035,436, filed on Jun. 5, 2020.

(51) Int. Cl.
*G06F 21/62* (2013.01)
*G06F 16/28* (2019.01)

(52) U.S. Cl.
CPC ........ *G06F 21/6254* (2013.01); *G06F 16/285* (2019.01)

(58) Field of Classification Search
CPC .... G06F 21/6254; G06F 21/285; G06F 16/35; G06F 16/38; G06F 16/313; G06F 16/5854; G06F 21/625; G06F 16/285
See application file for complete search history.

(56) References Cited

U.S. PATENT DOCUMENTS 10,663,305 B2 * 5/2020 Balu ............... G08G 1/012
2020/0018607 A1 * 1/2020 Balu ............... G08G 1/065
(Continued)

FOREIGN PATENT DOCUMENTS

CN     109561383 A     4/2019

OTHER PUBLICATIONS

Domingo-Ferrer, J., et al, "Microaggregation-and permutation-based anonymization of movement data", Information Sciences, vol. 208, pp. 55-80. (Year: 2012).*
(Continued)

*Primary Examiner* — Daniel B Potratz
(74) *Attorney, Agent, or Firm* — Peter H. Yu; HERE GLOBAL B.V.

(57) ABSTRACT

An approach is provided for data-preserving trajectory anonymization. The approach involves, for example, processing a plurality of location trajectories to determine one or more exchange twists. The plurality of location trajectories are respectively a sequence of locations points determined by a location sensor of a device, and the one or more exchange twists are one or more locations at which at least two trajectories of the plurality of location trajectories match based on a matching criterion. The approach also involves initiating a swapping of one or more trajectory identifiers among the plurality of location trajectories based on the one or more exchange twists to generate anonymized trajectory data. The approach further involves providing the anonymized trajectory data as an output to a location-based service.

14 Claims, 17 Drawing Sheets

(56) References Cited

U.S. PATENT DOCUMENTS

2021/0150269 A1* 5/2021 Choudhury ........ G06V 30/1985
2021/0165912 A1* 6/2021 Huang ................ G06F 21/6254
2022/0120585 A1* 4/2022 Max ..................... H04W 12/02

OTHER PUBLICATIONS

Poulis, G. et al, "Select-Organize-Anonymize: A framework for trajectory data anonymization", IEEE 13th International Conference on Data Mining Workshops (Year: 2013).*
Mano et al., "Pseudonym Exchange for Privacy-preserving Publishing of Trajectory Data Set", 2014 IEEE 3rd Global Conference on Consumer Electronics (GCCE), Feb. 2015, pp. 691-695.
Domingo-Ferrer et al., "Microaggregation-and Permutation-based Anonymization of Mobility Data", Apr. 20, 2012, retrieved from https://crises-deim.urv.cat/web/docs/publications/journals/691.pdf, 47 pages.
Zhang et al., "Mixgroup: Accumulative Pseudonym Exchanging for Location Privacy Preservation in Vehicular Social Networks", IEEE Transactions on Dependable and Secure Computing, vol. 13, No. 1, Feb. 16, 2015, pp. 93-105.

\* cited by examiner

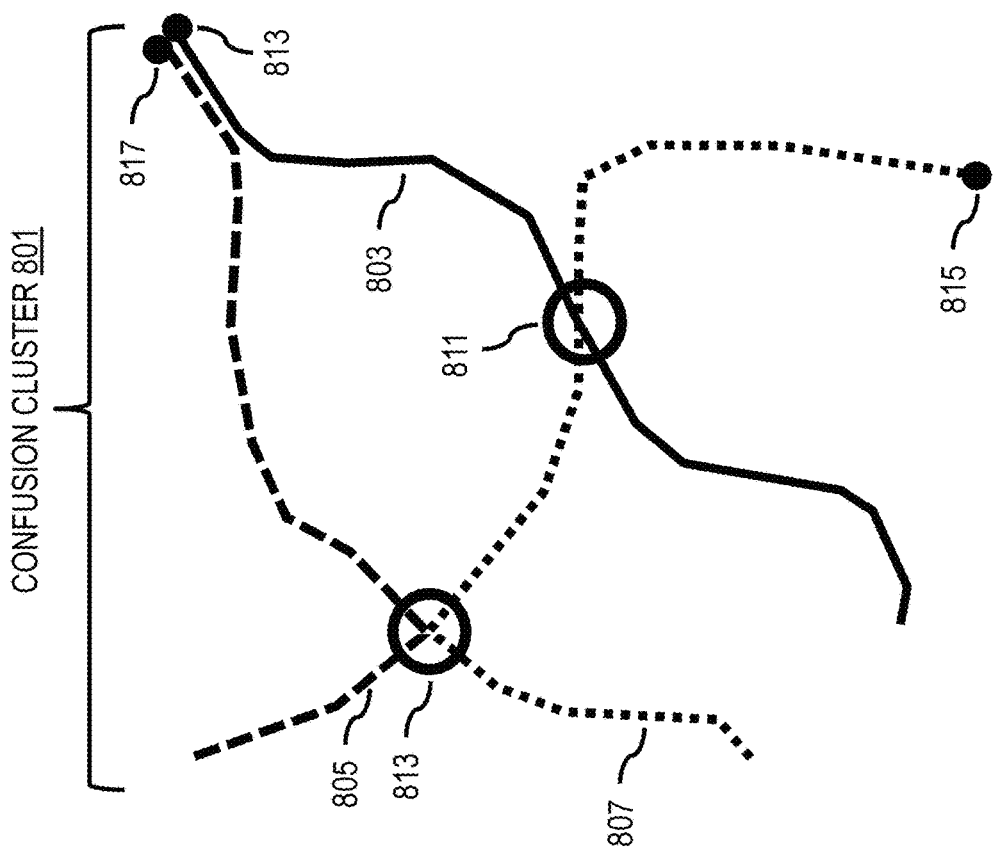
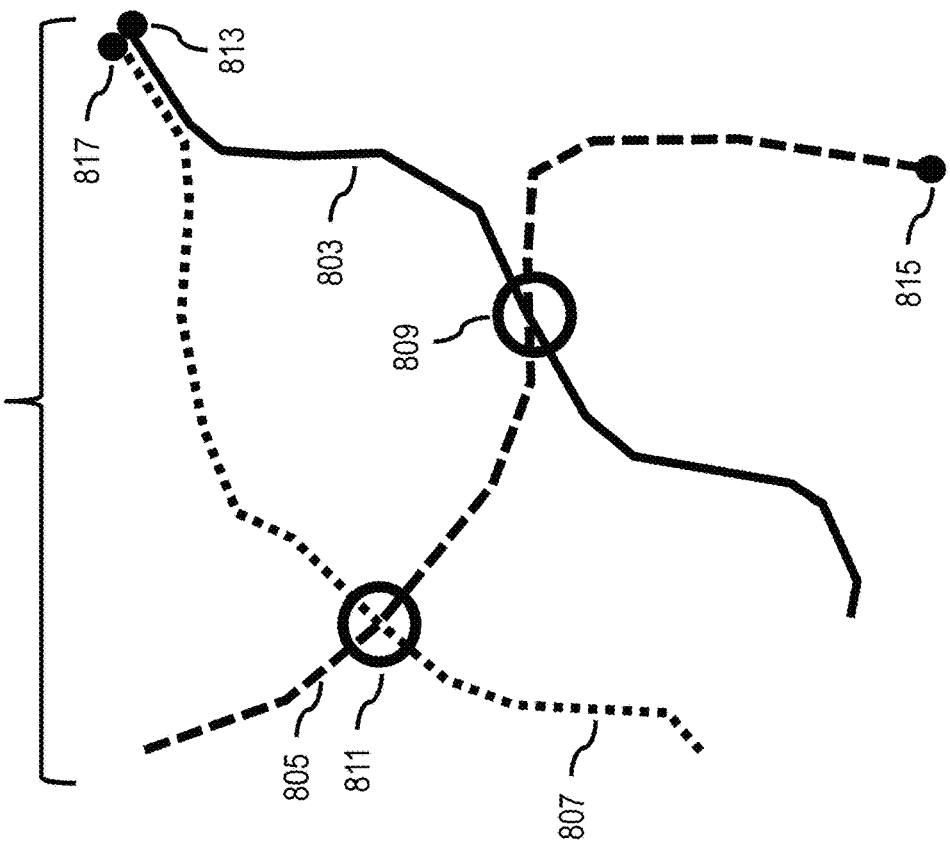

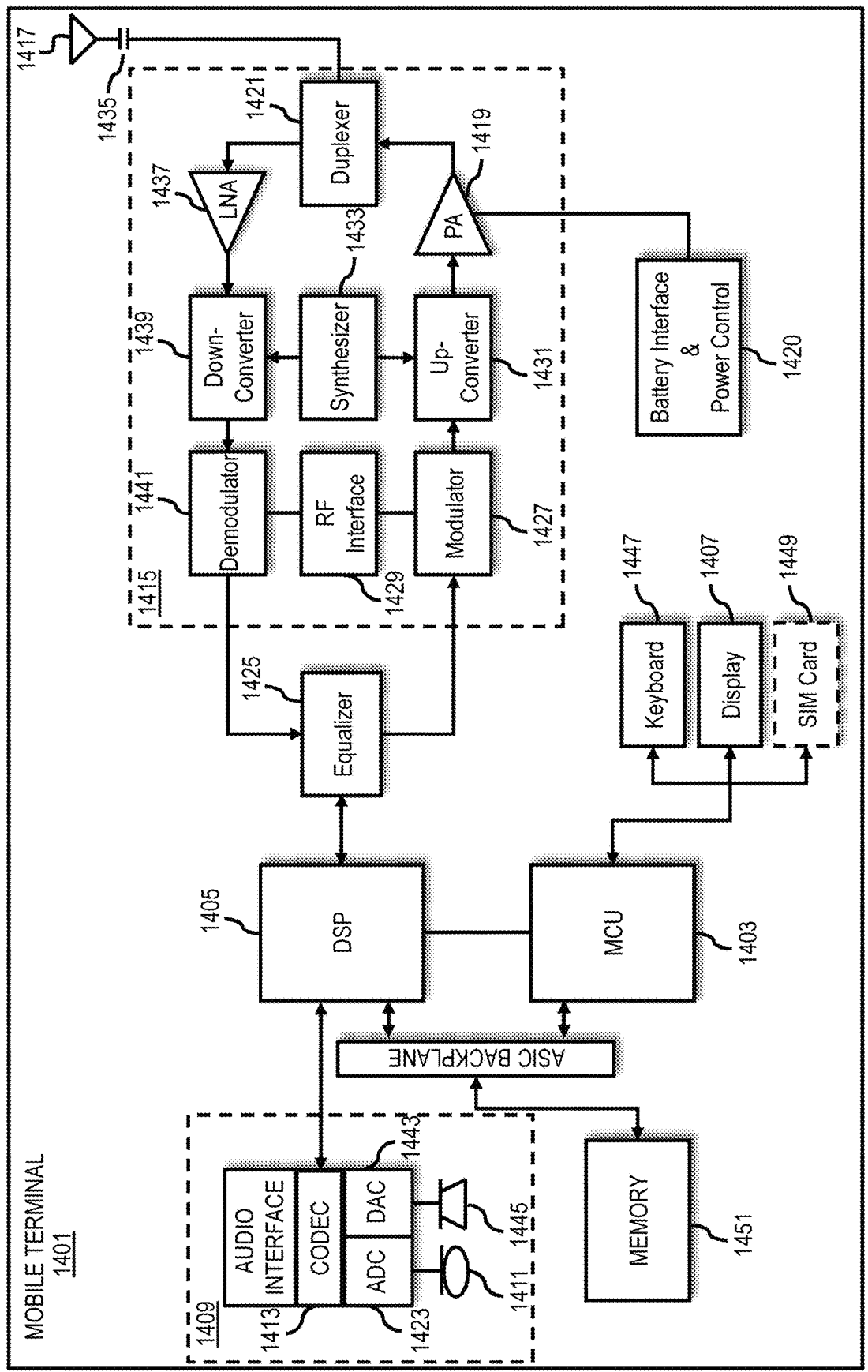

METHOD AND APPARATUS FOR TRAJECTORY ANONYMIZATION BASED ON A TRAJECTORY EXCHANGE TWIST

RELATED APPLICATION

This application claims priority from U.S. Provisional Application Ser. No. 63/035,436, entitled "METHOD AND APPARATUS FOR TRAJECTORY ANONYMIZATION BASED ON A TRAJECTORY EXCHANGE TWIST," filed on Jun. 5, 2020, the contents of which are hereby incorporated herein in their entirety by this reference.

BACKGROUND

The field of technology is privacy preserving data publishing. Location-based service providers historically collect location data to be used in their services and applications. Location data generally can be collected as a trajectory representing a sequence of data entries per individual moving entity (e.g., also referred to as a probe device such as a vehicle), where each entry consists of location (latitude, longitude), time stamp, a pseudonym (e.g., a unique probe identifier to indicate which of the entries belong to the same entity), and possibly various additional information about the entity at the time (e.g., vehicle sensor data, speed, heading etc.). However, location data is generally regarded as personal data, so that companies wanting to process personal location data often must employ anonymization of the trajectory data where the data cannot be attributed to an identifiable person or user. Accordingly, service providers face significant technical challenges to data anonymization to preserve privacy while also preserving data accuracy.

SOME EXAMPLE EMBODIMENTS

Therefore, there is a need for an approach for trajectory anonymization that avoids data suppression.

According to one embodiment, a method comprises processing a plurality of location trajectories to determine one or more exchange twists. The plurality of location trajectories are respectively a sequence of locations points determined by a location sensor of a device, and the one or more exchange twists are, for instance, one or more locations at which at least two trajectories of the plurality of location trajectories match based on a matching criterion. The method also comprises initiating a swapping of one or more trajectory identifiers among the plurality of location trajectories based on the one or more exchange twists to generate anonymized trajectory data. The method further comprises providing the anonymized trajectory data as an output to a location-based service.

According to another embodiment, an apparatus comprises at least one processor, and at least one memory including computer program code for one or more computer programs, the at least one memory and the computer program code configured to, with the at least one processor, cause, at least in part, the apparatus to process a plurality of location trajectories to determine one or more exchange twists. The plurality of location trajectories are respectively a sequence of locations points determined by a location sensor of a device, and the one or more exchange twists are, for instance, one or more locations at which at least two trajectories of the plurality of location trajectories match based on a matching criterion. The apparatus is also caused to initiate a swapping of one or more trajectory identifiers among the plurality of location trajectories based on the one or more exchange twists to generate anonymized trajectory data. The apparatus is further caused to provide the anonymized trajectory data as an output to a location-based service.

According to another embodiment, a computer-readable storage medium carries one or more sequences of one or more instructions which, when executed by one or more processors, cause, at least in part, an apparatus to receive a probe trajectory generated from at least one sensor of a probe device. The apparatus is also caused to process a plurality of location trajectories to determine one or more exchange twists. The plurality of location trajectories are respectively a sequence of locations points determined by a location sensor of a device, and the one or more exchange twists are, for instance, one or more locations at which at least two trajectories of the plurality of location trajectories match based on a matching criterion. The apparatus is also caused to initiate a swapping of one or more trajectory identifiers among the plurality of location trajectories based on the one or more exchange twists to generate anonymized trajectory data. The apparatus is further caused to provide the anonymized trajectory data as an output to a location-based service.

According to another embodiment, an apparatus comprises means for processing a plurality of location trajectories to determine one or more exchange twists. The plurality of location trajectories are respectively a sequence of locations points determined by a location sensor of a device, and the one or more exchange twists are, for instance, one or more locations at which at least two trajectories of the plurality of location trajectories match based on a matching criterion. The apparatus also comprises means for initiating a swapping of one or more trajectory identifiers among the plurality of location trajectories based on the one or more exchange twists to generate anonymized trajectory data. The apparatus further comprises means for providing the anonymized trajectory data as an output to a location-based service.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A-8D illustrates an example of activating exchange twists, according to one embodiment;

FIG. 14 is a diagram of a mobile terminal that can be used to implement an embodiment.

DESCRIPTION OF SOME EMBODIMENTS

Examples of a method, apparatus, and computer program for providing trajectory anonymization based on negative gapping are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
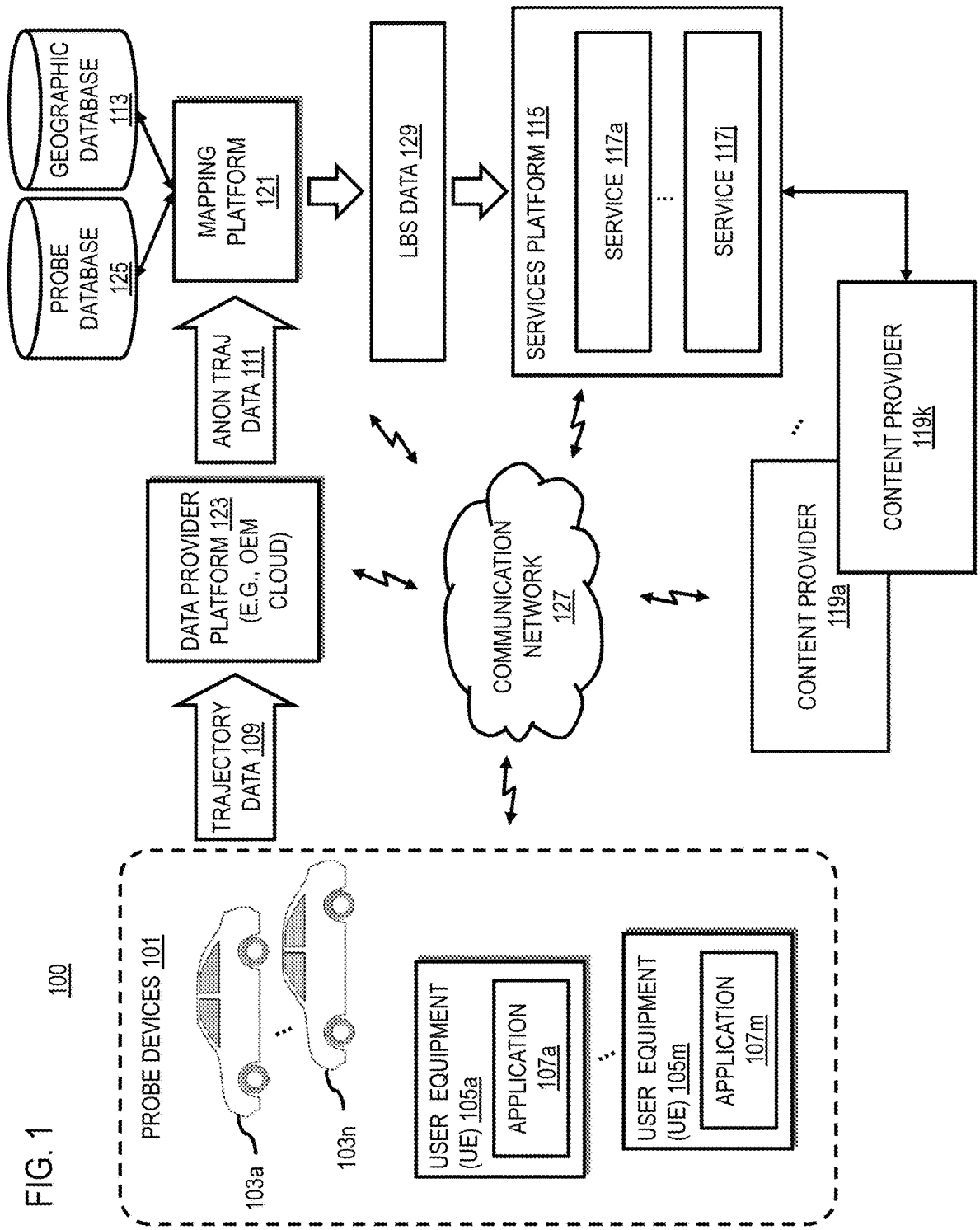
FIG. 1 is a diagram of a system for providing trajectory anonymization based on trajectory exchange twists, according to one embodiment.

FIG. 1 is a diagram of a system for providing trajectory anonymization based on trajectory exchange twists, according to one embodiment. Location-based services (LBS) (e.g., real-time traffic information, fleet management, navigation, etc.) often are based on the analysis of mobility data that users of such services provide. In one embodiment, mobility data can be collected as a location trajectory representing a sequence of data entries per individual moving entity (e.g., individual probe devices 101), where each entry (e.g., a probe point) consists of location (latitude, longitude), time stamp, a pseudonym or trajectory identifier (ID) (e.g., to indicate which of the entries belong to the same entity), and possibly various additional information about the entity at the time (vehicle sensor data, speed, heading etc.). Examples of probe devices 101 include but are not limited to vehicles 103a-103n (also collectively referred to as vehicles 103), user equipment (UE) devices 105a-105m (also collectively referred to as UEs 105) executing location-based applications 107a-107m (also collectively referred to as applications 107), and/or equivalent devices equipped with location sensors (e.g., Global Navigation Satellite System (GNSS) receivers) capable of generating location data (e.g., trajectory data 109).

Mobility data are generally associated to an accuracy value and a privacy value. In one embodiment, the accuracy value can be determined from the intrinsic utility of the data towards the generation of an LBS. For example, if the mobility data is used to calculate vehicle speed or other equivalent parameter for the LBS, then the accuracy value of the mobility data is based on the accuracy of the resulting speed or whether the mobility data is able to result in a speed value that meets target levels of accuracy. In one embodiment, the privacy value of the mobility data reflects the sensitive information that mobility data may reveal about a user's habits, behaviors, personal information (e.g., a user's home address), and/or other privacy sensitive data.

Maintaining a balance between the accuracy value and privacy value of mobility data presents significant technical challenges. For example, an LBS provider generally wishes to collect as much data as possible, in order to maximize the accuracy of the LBS, while at the same time minimizing the associated risks for the privacy of users, related to the inadvertent disclosure or misuse of data.

In order to reduce this risk, LBS providers often apply privacy-enhancing algorithms on the data. Traditional privacy-enhancing algorithms typically work by applying noise onto the data, which renders the data less accurate and therefore less valuable for the LBS provider. Under some traditional approaches, the noise can tailored to a specific use case (e.g., estimation of traffic, popularity of POIs, etc.) to potentially enhance accuracy, but the use of tailored noise can limit the reusability of privacy-enhanced data for use cases other than the one to which the noise has been tailored. Therefore, LBS providers face additional technical challenges to improving the reusability of privacy-enhanced data across multiple use cases and reducing the computational and technical resources needed to generate privacy-enhanced mobility data for those multiple use cases.

To address these technical challenges, the system 100 of FIG. 1 introduces a capability to solve the problem of collecting high-fidelity user mobility data in a central location for analysis and provision of Location Based Services, while providing privacy on the behavior of users by mixing trajectories from different users. By way of example, mobility data can be defined as a set of location data points, each of which is composed by latitude, longitude, and timestamp. Additional information can be associated to a data point, such as speed, heading. If a trajectory ID is associated to each point, the mobility data can be partitioned in a set of trajectories (e.g., trajectory data 109), each of which identifies the movement of a user of a probe device 101 over time.

In the example of FIG. 1, the system 100 includes an LBS provider (e.g., operator of a mapping platform 121 or other equivalent mapping/navigation service provider). Generally, the LBS provider (e.g., the mapping platform 121) wants to aggregate trajectory data 109 from several mobility data producers (e.g., probe devices 101 such as vehicles 103 and/or UEs 105) and/or data providers platforms 123. Data provider platforms 123 (e.g., operated by Original Equipment Manufacturers (OEMs) as respective OEM clouds) can collect raw trajectory data 109 (e.g., full location trajectories traveled by the probe devices 101) for access by an LBS provider (e.g., mapping platform 121). In one embodiment, the data provider platform 123 (e.g., OEM cloud) can apply a privacy-enhancing algorithm to their collected trajectory data 109 before sending the anonymized (or privacy-enhanced) trajectory data 111 to the LBS provider (e.g., mapping platform 121) for processing and storage in the probe database 125. By way of example, the probe database 125 can be processed, e.g., in combination with digital map data of the geographic database 113) to provide LBS data 129 (e.g., traffic data, average speed data, traffic incident reports, map updates, etc.). The mapping platform 121 can then output the LBS data 129 (e.g., derived from the anonymized trajectory data 111) to other services and applications such as but not limited to the service platform 115, services 117, and/or content providers 119. In this way, privacy-sensitive data collected from the probe devices 101 are not exposed upstream data users of the data (e.g., LBS provider, services and applications depending on the LBS data 129, etc.).

Under one scenario, the system 100 often is requested to satisfy at least some of the following technical requirements to provide the anonymized trajectory data 129:
  The data collected by the LBS provider should be complete, i.e., data should not be suppressed.
  The spatiotemporal information of data points should be accurate, i.e., spatiotemporal noise cannot be applied.
  The local connectivity, i.e., the relation between consecutive points in a trajectory, should be preserved, but small noise (e.g., noise below a designated threshold) can be tolerated.
  Global connectivity, i.e., the shape of trajectories, where they started and what locations they visited is not crucial for the analysis, as it would be the case when, e.g., computing the length of trajectories.

To meet these technical requirements, the system 100 provides a privacy-enhancing process that enables the data provider platform 123 to anonymize trajectory data 109 while preserving data accuracy for LBS.

In one embodiment, the system 100 provides a trajectory anonymization process that creates ambiguity in the connectivity between points of a trajectory dataset, e.g., by exchanging trajectory IDs or equivalent identifiers/pseudonyms at locations where points belonging to different trajectories are nearby in space and time. As used herein, locations/points with such as configuration are referred to as "exchange twists." This approach keeps the data about each location point accurate (e.g., not perturbed) in its space or time component. Nevertheless, the ambiguity caused by swapping trajectory IDs at exchange twists creates privacy through plausible deniability about the actual paths taken by the user, while allowing the retention of the trajectory information in the output (e.g., the anonymized trajectory data 111).

Figure 2:
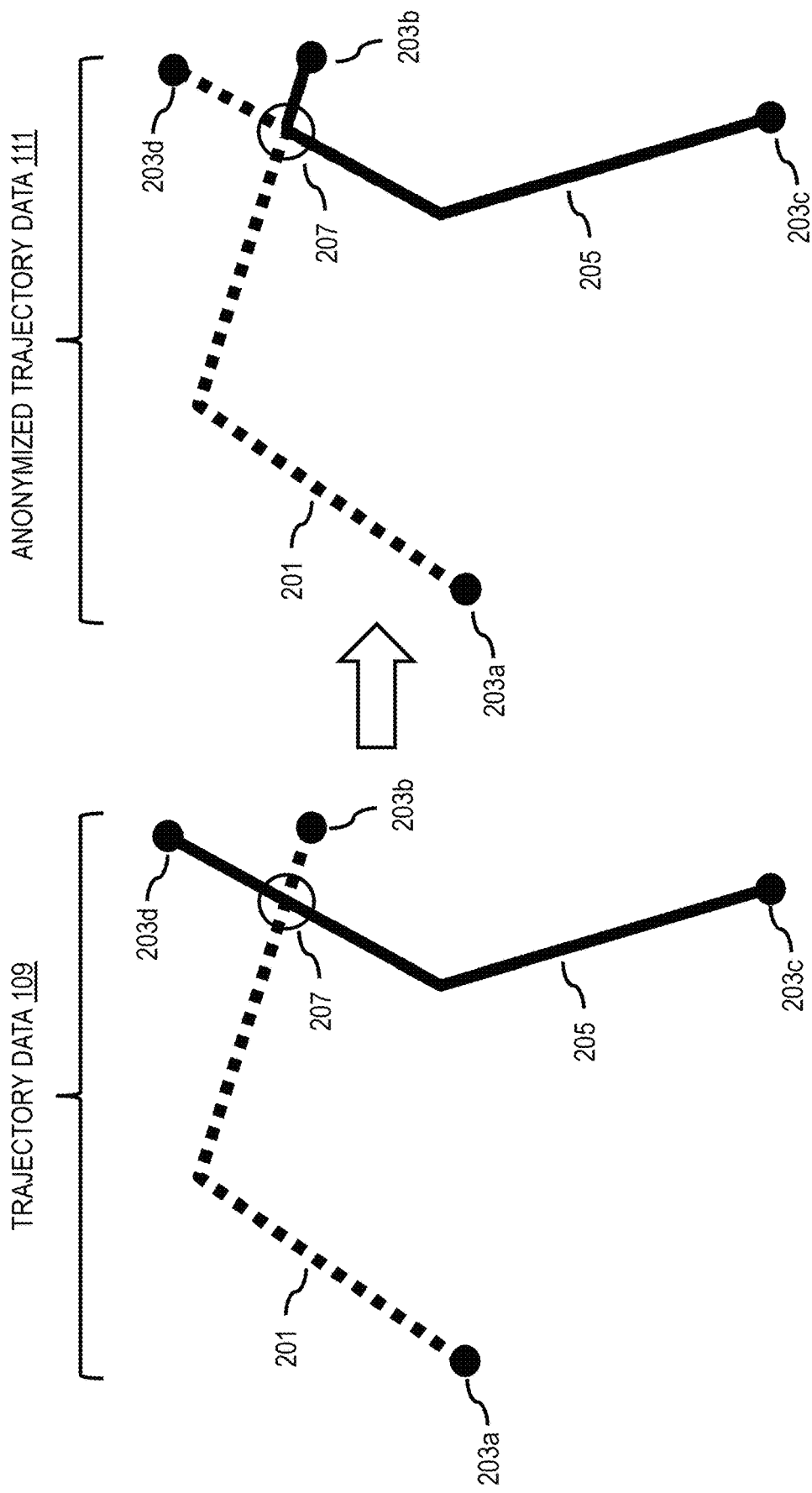
FIG. 2 is a diagram illustrating an example of trajectory anonymization based on a trajectory exchange twist, according to one embodiment.

FIG. 2 is a diagram illustrating an example of trajectory anonymization based on a trajectory exchange twist, according to one embodiment. In the example of FIG. 2 the raw trajectory data 109 includes a first location trajectory 201 captured from a first probe device/user traveling from starting point 203a and to ending point 203b, and a second location trajectory 205 captured from a second probe device/user traveling from starting point 203c to an ending point 203d. All of the location data points of the first trajectory 201 are associated with a first trajectory ID corresponding to the first device, and all of the location data points of the second trajectory 205 are associated with a second trajectory ID corresponding to the second device. In one embodiment, the system 100 detects an exchange twist 207 as a location at which the trajectories 201 and 205 are considered near with respect to spatiotemporal thresholds or other designated matching criteria. In this case, the exchange twist 207 is a location at which trajectory 201 crosses with trajectory 205 (e.g., crosses in space and/or time). As shown, to generate the anonymized trajectory data 111, the system 100 swaps the trajectory IDs of the first and second trajectories 201 and 205 for the location points occurring after the exchange twist. This results in the first trajectory now appearing to start from point 203a and now ending at point 203d, and the second trajectory 205 appearing to start from point 203c and ending at point 203b. Thus, the starting/ending locations of the original trajectories 201 and 205 have had their privacy enhanced such that the original starting/ending locations are obscured without suppressing any of the trajectory data. In other words, the swapping of trajectory IDs at exchange twists increases user privacy in the attack scenario such as but not limited to where an attacker tracks the movements of a user, as well as in the scenario where an adversary is interested in matching trip origin and destination.

In one embodiment, the approach described herein differs from traditional approaches by changing the perspective from individual swap points to groups of trajectories which have swaps in common. The system 100, for instance, receives and processes full trajectories versus, for instance, using swap points for trajectories or portions thereof that are yet to be collected. In other words, full trajectories are those that have already been captured and stored by one or more sensors of corresponding probe devices 101. For example, in one embodiment, the system 100 can group trajectories based on the trajectories' sharing at least one common or connected exchange twist (e.g., as used herein, the sets of trajectories with at least one common exchange twist are referred to as confusion clusters).

In one embodiment, having full trajectories in confusion clusters enables the system 100 to optimize the choice of which subset of swaps to be executed, with repercussions on the quality and privacy of anonymized data. There are several advantages in executing only a subset of swaps including but not limited to any of the following:

In terms of computational efficiency, reducing the number of swaps can speed up the execution of the trajectory anonymization algorithm or process, e.g., two vehicles 103 that drive on parallel lanes on a highway might produce many swaps that are close in space and time and whose outcome is equivalent to that of a single swap.

In terms of data quality, a lower number of swaps keeps the data more truthful, hence increasing its quality. By considering the full trajectories, swaps that do not significantly increase the privacy of the drivers can be excluded, e.g., swapping segments of trajectories that are traversing in areas that are not privacy sensitive.

In terms of data privacy, performing certain swaps might reduce the privacy of drivers, e.g., swapping once the IDs of two trajectories that share two exchange twists unlinks the origins from the destinations, and swapping the IDs again at a later time would restore the original link between origins and destinations.

In terms of data plausibility, several swaps might lead to anonymized trajectories with implausible maneuvers, which can be identified by an observer and used to undo the anonymization, e.g. a vehicle on the left lane turning right and a vehicle on the right lane turning left, which in real life would lead to an accident.

In one embodiment, to identify these problematic swaps and prevent their execution, the system 100 considers full trajectories and the interactions between the full trajectories. For example, the system 100 may perform any combination of the following:

Computational efficiency: consider the interactions between consecutive swaps.

Data quality: consider the characteristics of a trajectory, e.g., its privacy sensitivity (as determined according to a selected privacy metric) between swaps.

Data privacy: consider the interactions between trajectories.

Data plausibility: consider the characteristics of the trajectory and of the map it traverses (e.g. by comparing against the digital map data of the geographic database 113), right after a swap.

Additionally, the grouping of trajectories into confusion clusters advantageously enables the system 100 to easily identify trajectories which do not share any swap with any other trajectory. In one embodiment, the system 100 can identify trajectories which are not associated with any confusion cluster (e.g., trajectories which do not have exchange twists with any other recorded or selected trajectory of interest). These trajectories will not have exchange twists, and therefore cannot be anonymized by swapping trajectory IDs according to the various embodiments described herein. In one embodiment, on detecting such trajectories, the system 100 can apply another anonymization technique and further increase the privacy value of the anonymized dataset.

In one embodiment, the independence between confusion clusters enables the system 100 to apply for each cluster a different level of anonymization, which might be based on the privacy preferences of drivers or other users whose trajectories belong to the same cluster. This use of differing levels of anonymization between confusion clusters enables the system 100 to improve overall utility by choosing a more moderate privacy setting in those clusters where drivers/users are not particularly concerned about privacy, and vice versa improve overall privacy by choosing a more aggressive privacy setting in those clusters where drivers/users are particularly concerned about privacy.

Figure 3:
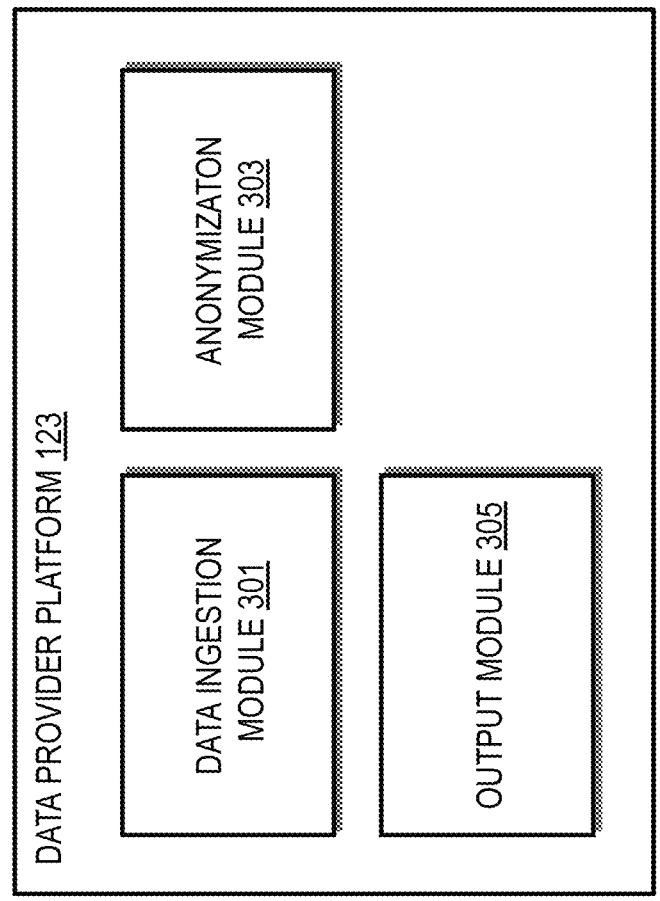
FIG. 3 is a diagram of the components of a mapping platform capable of trajectory anonymization based on trajectory exchange twists, according to one embodiment.

In one embodiment, as shown in FIG. 3, a data provider platform 123 of the system 100 includes one or more components for performing trajectory anonymization based on exchange twists according to the various embodiments described herein. It is contemplated that the functions of the components of the data provider platform 123 may be combined or performed by other components of equivalent functionality. As shown, in one embodiment, the data provider platform 123 includes a data ingestion module 301, an anonymization module 303, and an output module 305. The above presented modules and components of the data provider platform 123 can be implemented in hardware, firmware, software, or a combination thereof. Though depicted as a separate entity in FIG. 1, it is contemplated that the data provider platform 123 may be implemented as a module of any of the components of the system 100 (e.g., a component of the mapping platform 121, services platform 115, services 117, content providers 119, and/or the like). In another embodiment, one or more of the modules 301-305 may be implemented as a cloud-based service, local service, native application, or combination thereof. The functions of the data provider platform 123 and modules 301-305 are discussed with respect to FIGS. 4-9C below.

Figure 4:
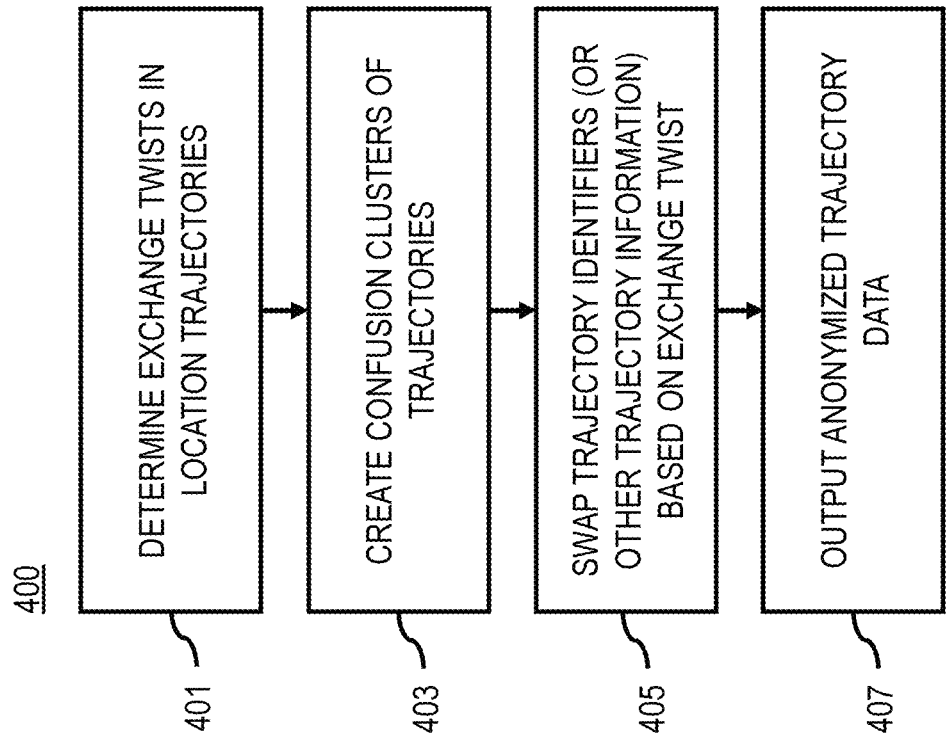
FIG. 4 is a flowchart of a process for providing trajectory anonymization based on trajectory exchange twists, according to one embodiment.
Figure 13:
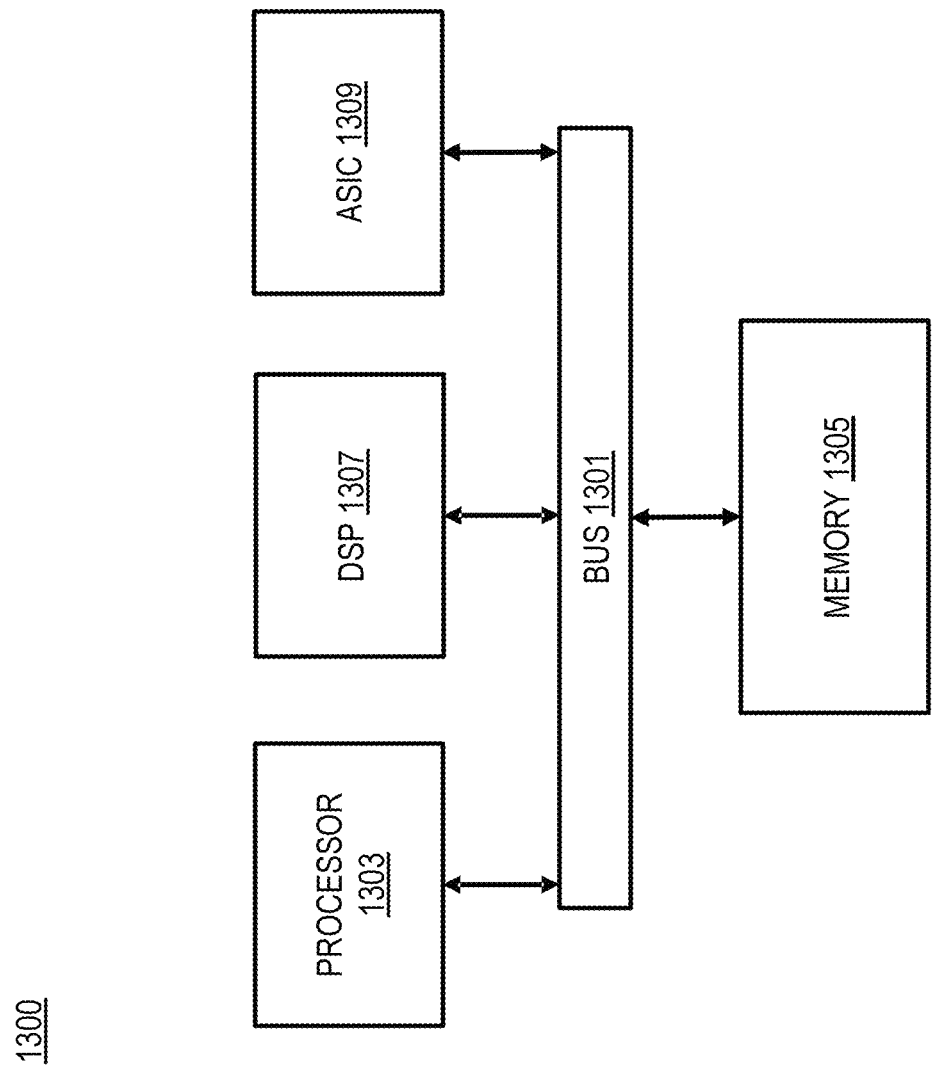
FIG. 13 is a diagram of a chip set that can be used to implement an embodiment.

FIG. 4 is a flowchart of a process for providing trajectory anonymization based on exchange twists, according to one embodiment. In various embodiments, the data provider platform 123 and modules 301-305 may perform one or more portions of the process 400 and may be implemented in, for instance, a chip set including a processor and a memory as shown in FIG. 13. As such, the data provider platform 123 and/or any of the modules 301-305 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In one embodiment, there are at least three classes of actors involved in the trajectory anonymization process: data producers, data providers, and LBS providers. The process 400, for instance, is described from the perspective of the data provider (e.g., data provider platform 123). By way of example, the data producers (e.g., probe devices 101 and/or their users) typically are users of GNSS (e.g. GPS, GALILEO, GLONASS, or the like) navigation devices, generate location data (e.g., raw trajectory data 109), and make them available for analysis. Data providers (e.g., data provider platforms 123 such as OEM clouds) collect mobility data from data producers. For example, data providers can be automotive OEMs and manage the navigation devices that data producers have in their vehicles 103 and collect the trajectory data produced by them. In one embodiment, the LBS provider (e.g., mapping platform 121) offers a product to the data producers (e.g., LBS data 129 such as traffic prediction data) which is obtained by analyzing user-generated data. Towards this end, the LBS providers collect data from the data providers, each data provider reveals the data produced by the users of its product.

The process 400 for trajectory anonymization includes three phases.

In the first phase (step 401), the data anonymization module 303 processes a plurality of location trajectories to determine one or more exchange twists. In one embodiment, the data ingestion module 301 collects the location trajectories as trajectory data 109 from one or more probe devices 101. The location trajectories are respectively a sequence of locations data points (e.g., timestamp, latitude, longitude) determined by a location sensor of a device (e.g., probe device 101) as the device travels. The data anonymization module 303 then constructs a set of exchange twists from the trajectories. In one embodiment, an exchange twist is defined for a pair of trajectories (T1, T2) and constitutes a pair of trajectory-segments (S1, S2), where S1 is a subtrajectory of T1 , and S2 is a subtrajectory of T2 , such that for every point P1 in S1 there's a point P2 in S2 (and vice versa) such that P1 and P2 are close to each other both in space and in time (or according to any other applied criteria for determining a match or proximity of two or more trajectory points). Intuitively, exchange twists represent parts of at least two trajectories where these trajectories come close to one another and the points of one can be mistaken for the points of the other. In other words, the one or more exchange twists are one or more locations at which at least two trajectories of the plurality of location trajectories match based on a matching criterion.

Figure 5B:
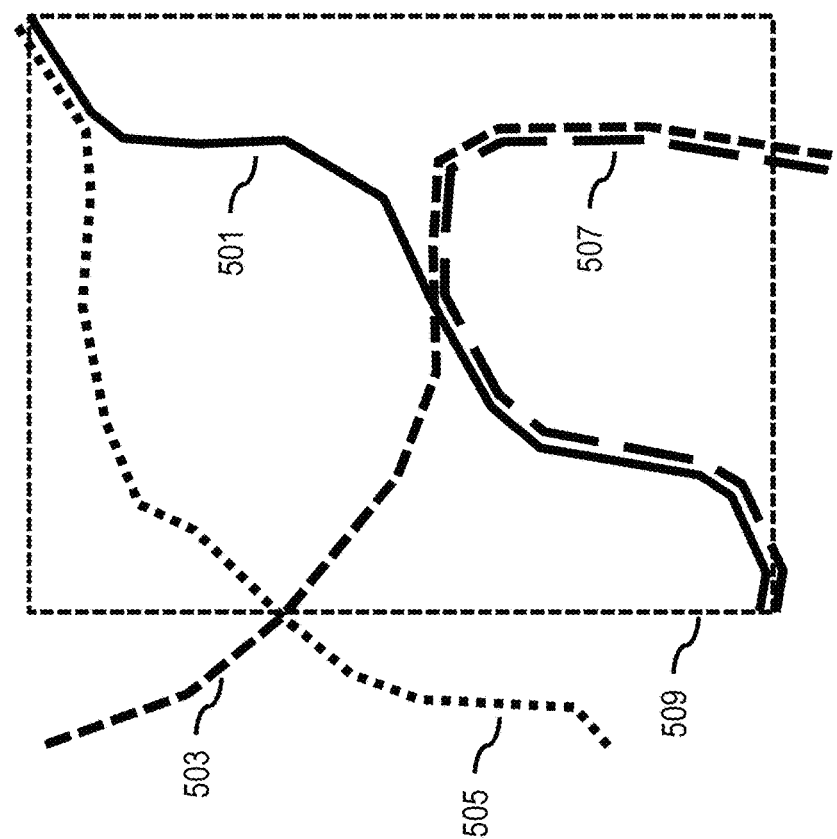
FIGS. 5A-5D are diagrams illustrating an example of determining exchange twists for a set of trajectories, according to one embodiment.

It is contemplated that the system 100 can use any process to determine exchanges twists based on matching location points between two or more location trajectories. On example algorithm or process for identify exchange twists is illustrated in the pseudocode presented in Table 1 below and described with respect to FIGS. 5A-6.

matches any points of the trajectory of interest T0 (e.g., reference location data points), given a definition of match. In one embodiment, the set of candidate trajectories can be filtered to advantageously reduce the search space for identifying exchange twists, thereby also reducing the corresponding computational resources used for processing. The set of candidate trajectories, for instance, can be selected based on proximity to the trajectory of interest T0 to within a threshold distance. As shown in FIG. 5B, one example trajectory selection process is to define a bounding box 509 around the trajectory of interest T0 (e.g., trajectory 501). Then any trajectories falling within this bounding box (e.g., trajectories 503-607) are selected as candidate trajectories for processing.

In the algorithm of Table 1, the identified candidate trajectories are added to the output set R. Then for each element T (e.g., each trajectory) in the set R, the anonymization module 303 checks whether any of the location data points of T matches with any location data point of the reference trajectory T0. If there is a match, T remains in the set R to indicate that there is an exchange twist between T and T0. If there is no match, T is removed from the output set R. After processing the candidate trajectories, the find_twists pseudo-function returns the elements remaining in R as its output to indicate trajectories that share at least one exchange twist with T0.

Table 2 below illustrates examples of finding twists among different trajectories in a set of candidate trajectories 501-507 according to one embodiment. For example, as shown in FIG. 5C, applying the find twist function to trajectory 501 as an input yields an output set R including trajectory 503. In this example, trajectory 503 matches as sharing an exchange twist with the trajectory of interest 501 while trajectories 505 and 507 do not match because only trajectory 503 directly crosses trajectory 501 at exchange twist point 511. Trajectories 505 and 507 do not match even though at least some portions of those are closely parallel to trajectory 501 because the matching criterion applicable in this example is configured to determine that close but parallel trajectories do not match. For example, a parallel trajectory may be separated by a physical divider (e.g.,

TABLE 1 algorithm find_twists(trajectory T0)
Start with an empty set R={ }
1. Select one trajectory of interest T0, e.g., trajectory 501 of FIG. 5A
2. Optionally find all trajectories that lie in its bounding box 507 of FIG. 5B, e.g., trajectories 503, 505, and 507, to reduce the search space for exchange twist detection
3. Update the set R={trajectory 503, trajectory 505, trajectory 507}
4. For each element T in R:
    1. Check whether any point of T matches with any point of T0. If not, remove T from R
5. return R={trajectory 503}

As shown in the example of Table 1, one possible implementation might involve the identification of all trajectories that have points in the vicinity of the trajectory for which twists have to be identified. For example, a pseudo-function "find_twists" can be defined that accepts a trajectory T0 as an input. Under this algorithm, the anonymization module 303 starts by creating an empty set R that represents the output of all trajectories sharing an exchange twist with the input trajectory T0. Given a set of candidate trajectories (e.g., trajectories 501-507 of FIG. 5A), the anonymization module 303 can identify any location data points in each of these trajectories (e.g., candidate location data points) which median, wall, etc.) that would make crossing between parallel lanes inconsistent with the underlying map data (e.g., as stored in the geographic database 113). Thus, the anonymization module 303 can ignore the swapping of the one or more trajectory identifiers based on determining that the swapping is not consistent with corresponding map data.

In the second example of Table 2, the anonymization module 303 processes trajectory 503 as the trajectory interest and yields an output set R including trajectories 501 and 505. As shown in FIG. 5D, trajectory 501 matches trajectory 503 at exchange twist location 511 and trajectory 505 matches trajectory 503 at exchange twist location 513.

In the third example of Table 2, the anonymization module 303 processes trajectory 505 as the trajectory interest and yields an output set R including trajectory 503. As shown in FIG. 5D, trajectory 503 matches trajectory 505 at exchange twist location 513.

In the fourth example of Table 2, the anonymization module 303 processes trajectory 507 as the trajectory interest and yields an empty output set R. As shown in FIG. 5D, trajectory 507 does not match or cross any other trajectory in the candidate set of trajectories 501-505. Instead, trajectory 507 merely runs parallel to portions of trajectories 501 and 503.

TABLE 2 find_twists(trajectory 501)={trajectory 503}
find_twists(trajectory 503)={trajectory 501, trajectory 505}
find_twists(trajectory 505)={trajectory 503}
find_twists(trajectory 507)={ }

As discussed above, the anonymization module 303 can use any designated criteria or definition for what constitutes a match between two or more location points of different trajectories for identifying exchange twists. An example definition of match includes but not is not limited to co-location to two location data points in space and time, given a spatial and a temporal threshold. Table 3 below illustrates an example pseudo-function "points_match" for determining a spatial and temporal match between any two location data points based on a spatial threshold and a temporal threshold. In other words, one example of a matching criterion is the matching criterion is based on determining that a first location point in a first trajectory of the plurality of trajectories is within a spatial threshold, a temporal threshold, or a combination thereof of a second location point in a second trajectory of the plurality of location trajectories.

Figure 6:
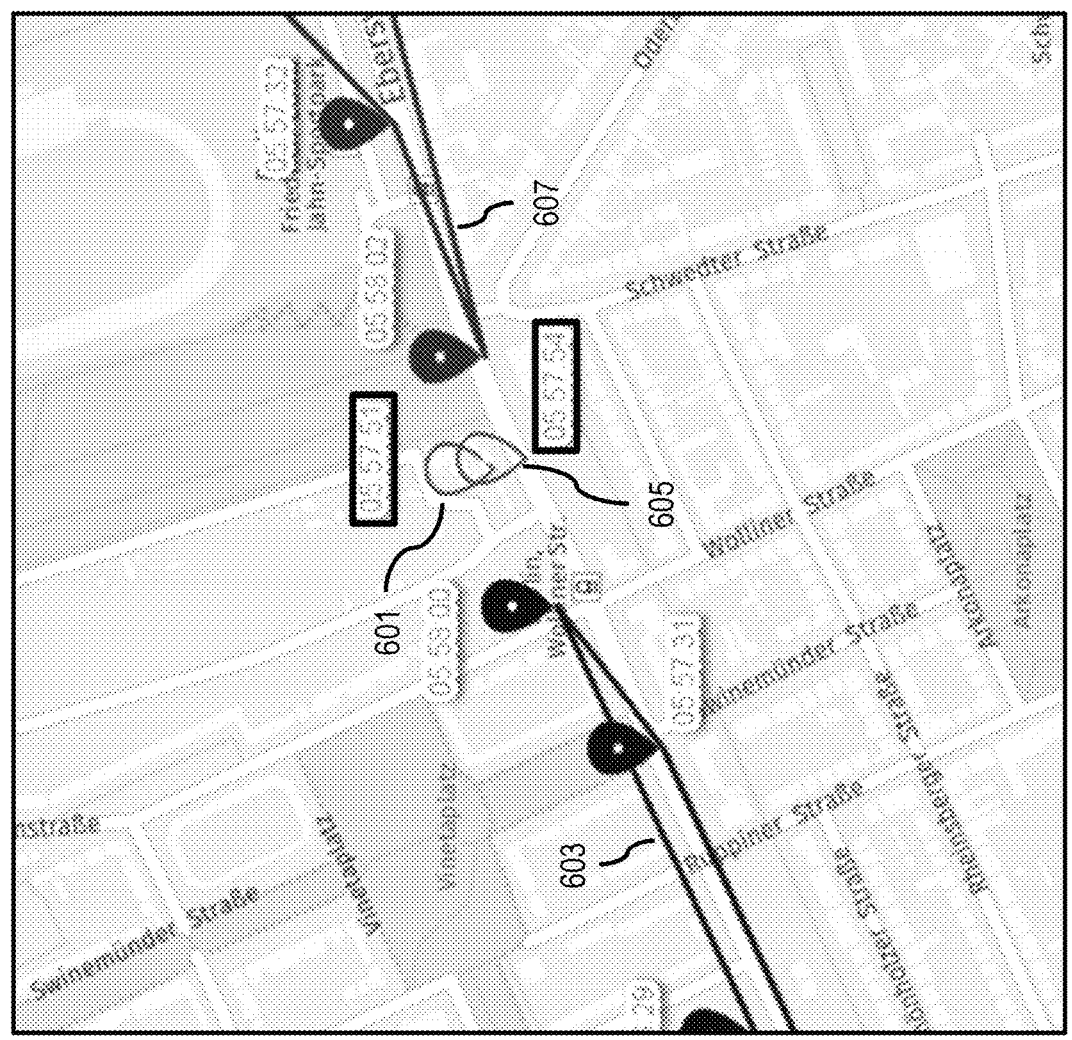
FIG. 6 is a diagram illustrating an example of determining trajectory matches to identify a trajectory exchange twist, according to one embodiment.

TABLE 3 algorithm points_match(p1,p2,
    spatial_threshold,
    temporal_threshold)
p1 and p2 belong to two different trajectories
    1.    Compute the geographical distance D between p1 and p2
    2.    Compute the time difference T between p1 and p2
    3.    Set cond1 as D <= spatial threshold
    4.    Set cond2 as T <= temporal threshold
    5.    Return a match if cond1 and cond2 are true For example, as shown in FIG. 6, the anonymization module 303 can evaluate a match between a point 601 of trajectory 603 and a point 605 of trajectory 607. The anonymization module 303 computes the geographic distance between points 601 and 605 and a time difference between the timestamps (e.g., the location sampling time) of the points 601 and 605. If the geographic distance is less than or equal to a designated spatial threshold and the time difference is less than or equal to a designated temporal threshold, then the anonymization module 303 can determine that the two points 601 and 605 match, and therefore, the corresponding trajectories 603 and 607 share an exchange twist.

In one embodiment, the anonymization module 303 and use a more sophisticated example of matching criteria. For example, a more sophisticated matching process could consider the map information (e.g., the digital map data of the geographic database 113) to determine if the probe device 101 that produced the trajectory of interest could realistically move from the location identified by the probe point, previous to the reference point, to the location identified by the candidate point, and vice versa if the probe device 101 that produced the candidate trajectory could realistically move from the location identified by the probe point, previous to the candidate point, to the location identified by the reference point.

In one embodiment, the anonymization module can construct a set of exchange twists in such a way that they are well separated, that is any pair of twists—seen as point-sets—are disjoint. This set, for instance, is not unique and depends on (1) the algorithm used to construct it and (2) additional requirements (e.g., optimization requirements) for generating the trajectory anonymization results. It is noted that a pair of trajectories can have more than one exchange twist associated with it as long as the twists satisfy the separability condition described above.

In the second phase of trajectory anonymization based on exchange twists (step 403), the anonymization module 303 can identify subsets of trajectories such that every trajectory in a subset C has an exchange twist with some other trajectory in the subset C. The subset C can be referred to as a "confusion cluster." In one embodiment, the confusion cluster C can be considered to be complete in the following sense: every trajectory that has an exchange twist with some trajectory in C belongs to C. In other words, the anonymization module 303 designates a plurality or set of location trajectories as a confusion cluster based on determining that each location trajectory of the plurality of location trajectories have the one or more exchange twists in common. The anonymized trajectory data 111 can then be generated for the confusion cluster.

Figure 7:
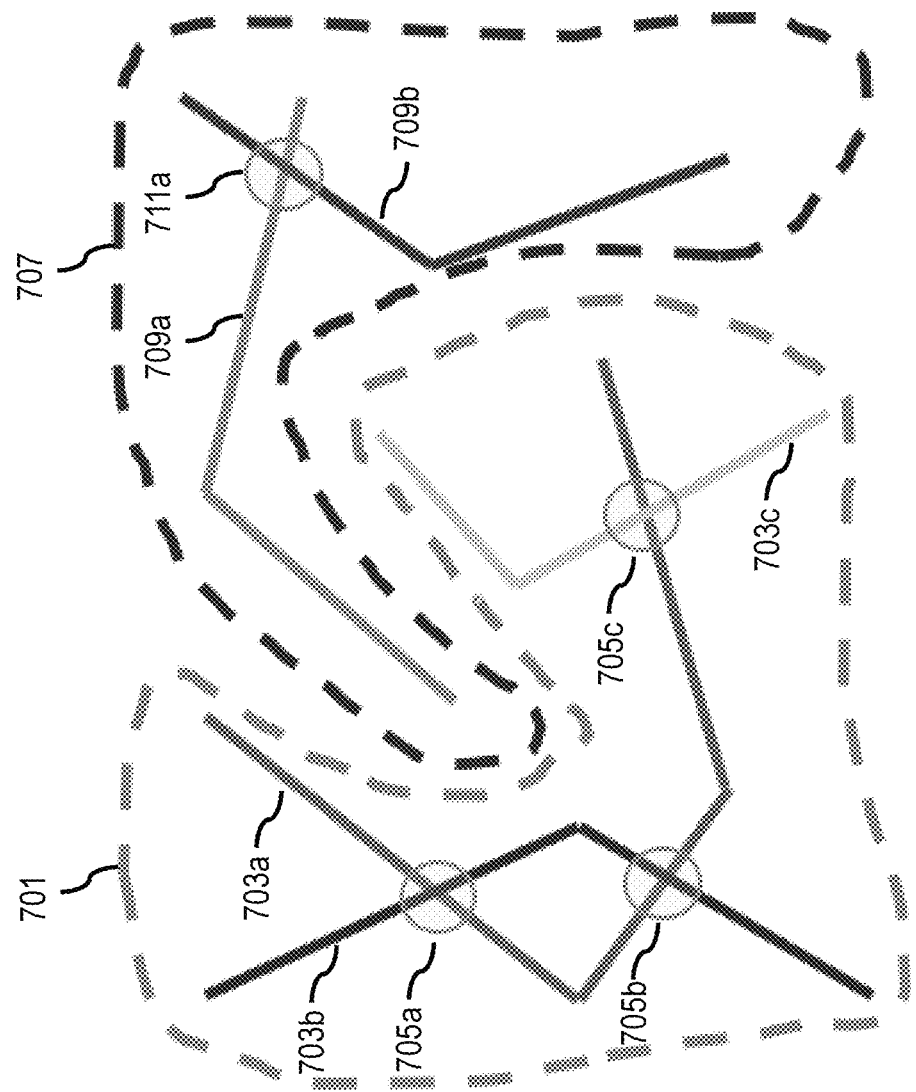
FIG. 7 is a diagram illustrating example confusion clusters for trajectory anonymization, according to one embodiment.

This way all confusion clusters in the dataset form a partition—that is, their union covers the dataset and the clusters are pairwise disjoint—on our trajectory set. For example, FIG. 7 illustrates examples of two confusion clusters 701 and 707 that are disjoint. As shown, confusion cluster 701 is composed by trajectories 703a and 703b having two exchange twists 705a and 705b associated with them, and trajectory 703c having an exchange twist 705c with trajectory 705a. Confusion cluster 707 s composed by trajectories 709a and 709b having one exchange twist 711a. Confusion clusters 701 and 707 are disjointed in the sense that none of the trajectories 703a-703c of confusion cluster 701 has an exchange twist with any of the trajectories 709a-709b of confusion cluster 707.

It is noted that the anonymization module 303 can use any algorithm or process that constructs confusion clusters, given a set of twists, as long as the conditions described above are respected. An example embodiment of a confusion cluster construction algorithm could start from identifying all exchange twists that are associated to a reference trajectory, and from these exchange twists generate a candidate list of trajectories which are associated to these exchange twists. As discussed above, in one embodiment, an exchange twist associates two or more trajectories. The algorithm would then recursively repeat on all trajectories identified in the candidate list, until the list is empty. A confusion cluster is defined by the trajectories processed by each execution of this algorithm. Table 4 below illustrates an example pseudo-function "find_clusters" that implements a process for creating confusion clusters.

TABLE 4

```
algorithm find_clusters(trajectories T)
    1. Define an empty set R to contain the results
    2. Pick a trajectory X among those in T that are not in R
        1. Define a set Y={ } to contain the partial results
        2. Define a set N={X} to contain the next elements
        3. Until N is empty
            1. Pick an element x from N
            2. Add x to Y and remove x from N
            3. Z=find_twists(x) is the set of trajectories that have a twist in
               common with x.
            4. Remove from Z trajectories that are already in Y and append Z to
               N.
        4. Add Y to R
Return R
```

Figure 5A:
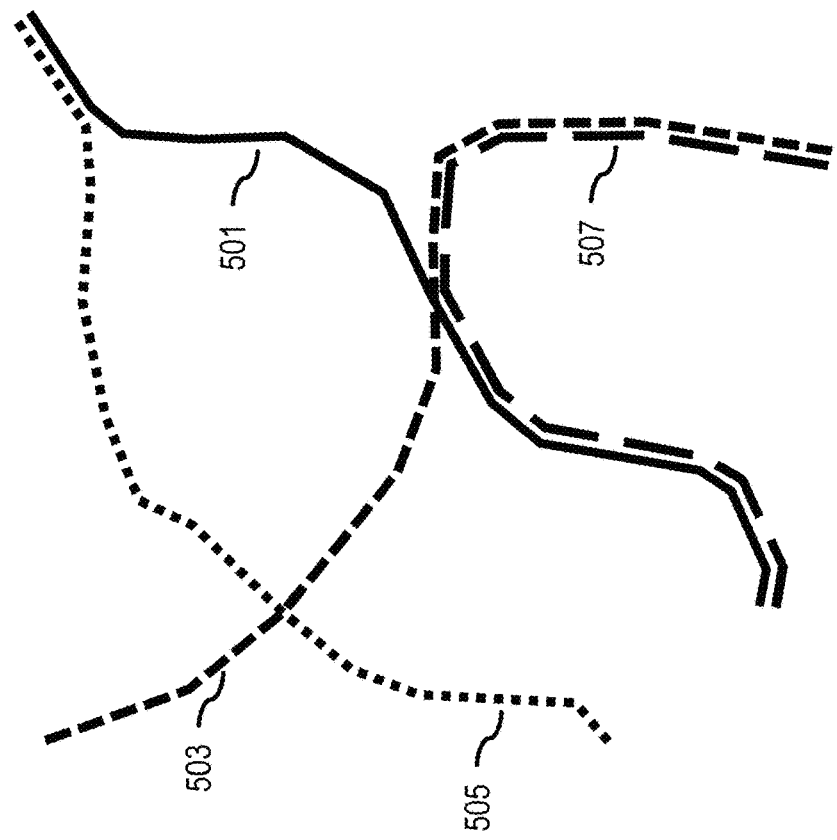
Figure 5D:
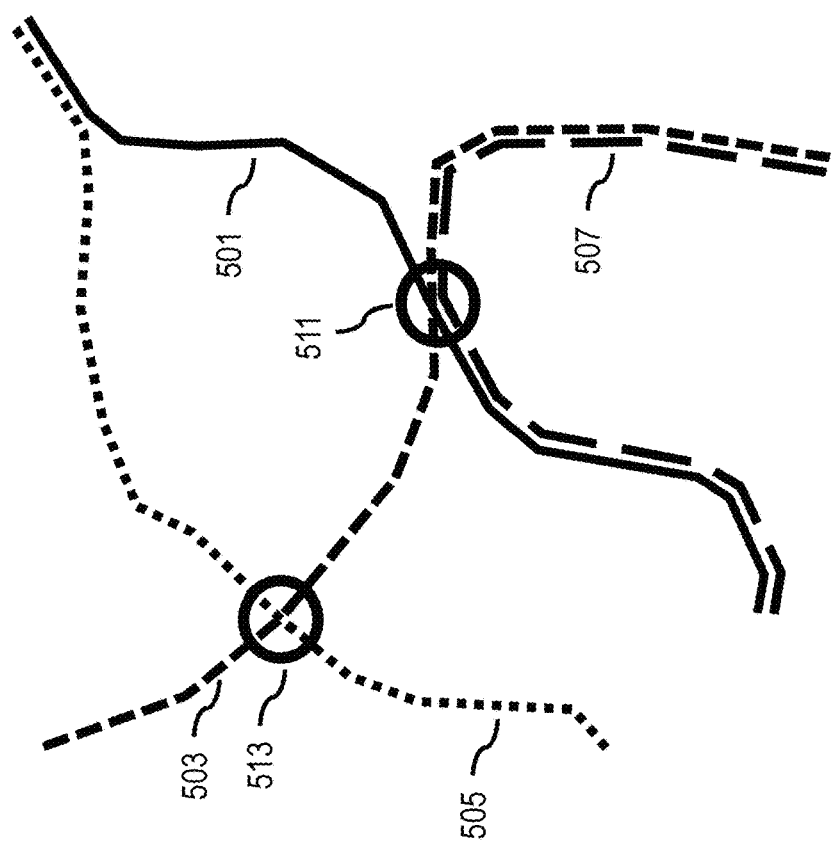
Figure 5C:
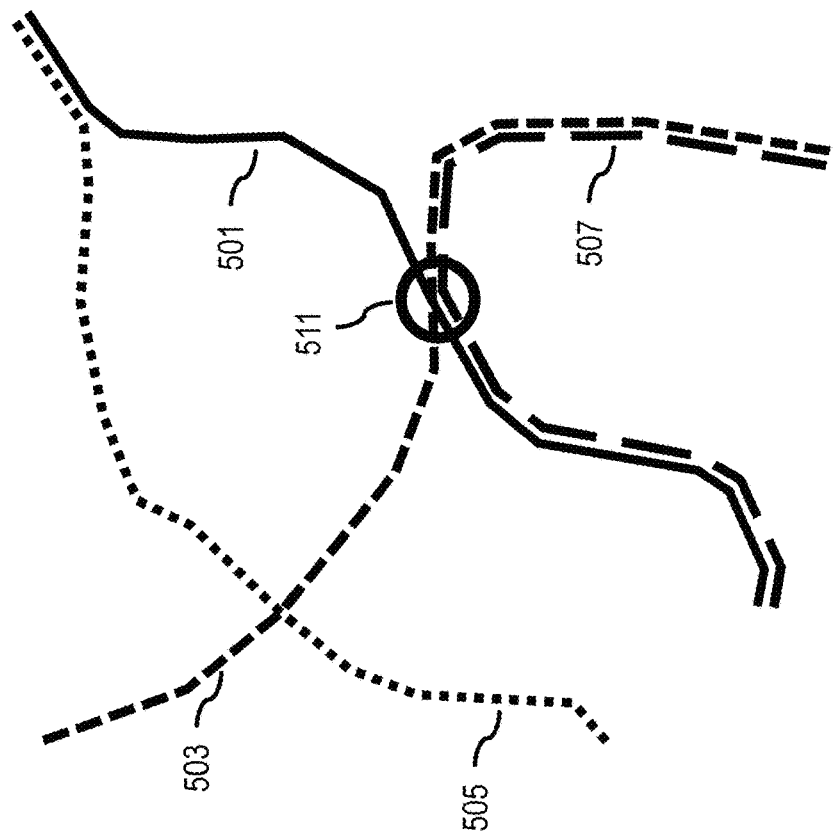

As an example, the confusion clustering process of Table 4 can be applied to the example trajectories 501-507 of FIG. 5A. In step 1 of Table 4, the anonymization module 303 defines an empty set R to contain the results and begins with a set of trajectories T (e.g., trajectories 501-507). The anonymization module 303 then picks a trajectory X from among those in T that are not in R. Initially, there are no trajectories T in R, so any of the trajectories 501-507 can be picked. For example, trajectory 501 can be selected as trajectory X. Based on this selection, the anonymization module 303 can define a set Y to contain partial results and a set N to contain the next element to process. Because trajectory 501 is selected as trajectory X, N will initially contain trajectory 501.

The anonymization module 303 can then iterate over the set N until it is empty by picking an element x from N. In this case, x is trajectory 501. Element x is added to Y and removed from N. Next, the anonymization module 303 creates a set Z of trajectories that have an exchange twist in common with x (e.g., trajectory 501). The find_twists function described above or equivalent can be used to find Z. In this example, Z will include trajectory 503 which has an exchange twist with trajectory 501. The anonymization removes Z trajectories that are already in Y and appends Z to N, thereby resulting in N including trajectory 503.

Because N is not yet empty (e.g., contains trajectory 503), the anonymization module 303 can repeat the above process by picking x from N, with x being trajectory 503. Trajectory 503 is added to Y and removed from N. The anonymization module 303 finds the set of trajectories Z that have an exchange twist in common with trajectory 503, resulting in Z containing trajectories 501 and 505 meeting this condition. The anonymization module 303 removes from Z any trajectories that are in Y (e.g., trajectory 501) so that Z will include only trajectory 505. Z is then appended to N so that N now contains trajectories 503 and 505.

Because N is again not yet empty (e.g., contains trajectory 505), the process is again repeated with trajectory 505. Trajectory 505 is removed from N and then added to Y. The anonymization module 303 then finds the set of trajectories Z that have an exchange twist with trajectory 505, resulting in Z containing trajectory 503 meeting this condition. However, because trajectory 503 is already in Y from a previous iteration, Z is an empty set. This also makes N empty, so that the process can end.

At this point, the set Y is added to the output set R (e.g., now containing a set comprising trajectories 501, 503, and 505 as one cluster). The set R represents a confusion cluster comprising trajectories with at least one common exchange twist and is returned as an output of the pseudo-function "find_clusters."

In one embodiment, for each of these clusters, a subset of exchange twists is selected for activation. Activation, for instance, refers to designating subtrajectories delineated by exchange twists for potential swapping. In this way, the anonymization module 303 can selectively swap trajectory IDs for different subtrajectories. The selection can be done either randomly or deterministically, depending on the anonymization strategy.

It is contemplated that the various embodiments described herein can use any process for selecting exchange twists to activate in a confusion cluster. By way of illustration and not as a limitation, an example exchange twist activation algorithm is provided in Table 5 below. The illustrated algorithm can leverage the dependency of some exchange twists on other exchange twists in the same confusion cluster, and the independence of any two exchange twists in separate clusters. For example, the independence of confusion clusters can be leveraged by executing in parallel the algorithm on each cluster, thus reducing the execution time. In other words, the swapping of the one or more trajectory identifiers is performed in parallel with a processing of another confusion cluster of a plurality of other location trajectories.

TABLE 5

```
algorithm activate_twists(trajectories T)
    1. C=find_clusters(T) is the set of clusters, e.g. C={(trajectory 501, trajectory 503,
       trajectory 505),(trajectory 507)}
    2. Remove from C all clusters with size=1, as they do not contain twists, e.g.,
       (trajectory 507). Store these trajectory IDs in the set of trajectories that cannot
       be anonymized using exchange twists according to the various embodiments
       described herein.
    3. For each element X of C, execute in parallel threads
        1. For all y in Y=select_twists(X), a subset of twists to activate
            1. Anonymize the corresponding trajectories with an algorithm
               swap_ids(y)
```

In one embodiment, the dependence of exchange twists inside a confusion cluster can be leveraged, for example, to reduce the number of swaps operations (e.g., and also the computational resource requirements and costs), by ignoring swaps that do not produce a relevant outcome. A relevant outcome, for instance, refers to anonymized trajectory data that increases or enhances privacy of the trajectory data. The level of privacy enhancement can be determined according to any privacy metric (e.g., by evaluating the degree to which the original origins/destinations of the original trajectories have been swapped in the anonymized trajectories).

For example, given a confusion cluster composed of two trajectories which intersect in two separate exchange twists at two distinct times, executing both swaps might reduce privacy with respect to executing a swap at only one twist, as in the former case the origin and destination of the two trajectories would be inverted twice and hence would match the original data. Preventing these swaps would increase the privacy of the anonymized data. Accordingly, in one embodiment, the anonymization module 303 can ignore swapping of the one or more trajectory identifiers based on determining that the swapping that does not increase privacy of the anonymized trajectory data based on a privacy metric. This privacy metric, for instance, can be based on a change of an origin, a destination, or a combination thereof of at least one trajectory of the plurality of location trajectories.

Table 6 below illustrates an example pseudo-function "select_twists" implementing an algorithm for selecting exchange twists in a confusion cluster to activate.

The anonymization module 303 can compute the initial privacy risk R for the confusion cluster based on the trajectories 803-807, and also compute a new privacy risk N for the trajectory swaps at each of the exchange twists. In one embodiment, the privacy risk can be computed according any privacy metric. One example of a privacy metric includes, but is not limited to, verifying that the new origins and destinations of the swapped trajectories differ from the original. For example, a higher privacy value can be assigned to a trajectory with either the origin or the destination changed, with an even higher privacy value assigned to a trajectory with both its origin and destination swapped. A lower privacy value can be assigned to a trajectory with neither origin nor destination having been swapped.

Figure 8D:
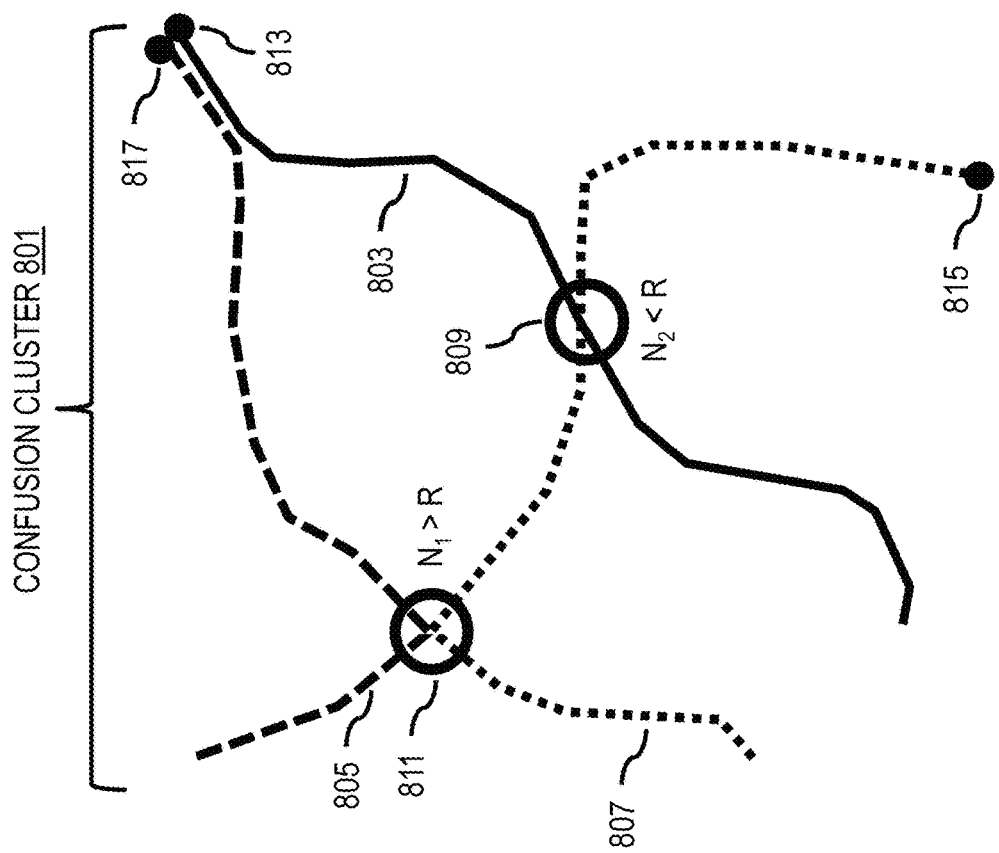

In one embodiment, if the new privacy level N (e.g., after swapping) is higher than the original risk level R (e.g., indicating that privacy has been enhanced), then the swap can be maintained. On the other hand, if the new privacy level N is less than the original risk level R, the swap can be rolled back. FIG. 8D illustrates an example where the swap occurring at exchange twist 811 has a computed new privacy level N1 that is greater than the original privacy level R, so the swap at exchange twist 811 can be activated. However, the swap at exchange twist 809 had a new computed privacy level N2 that is less than the original privacy level R. Accordingly, in one embodiment, the anonymization module 303 can deactivate the exchange twist (e.g., so that the

TABLE 6 algorithm select_twists(trajectories C)
    1.   S={find_twists(x), x in C} is the set of twists associated to trajectories in C
    2.   Compute the initial privacy risk R
    3.   For each twist X in S:
         1.   Activate the twist: swap_ids(X)
         2.   Compute the new privacy risk N, e.g. by verifying that the new origins and destinations differ from the originals
         3.   If N < R, deactivate the twist or otherwise roll back the changes FIGS. 8A-8D illustrates an example of activating exchange twists according to the various embodiments described herein. As shown in FIG. 8A, a confusion cluster 801 includes three trajectories 803, 805, and 807. The anonymization module 303 can identify a set S of exchange twists occurring the confusion cluster 801 by applying, for instance, the pseudo-function find_twists on each trajectory 803-807 in the confusion cluster 801. This operation results in the S for the confusion cluster 801 containing exchange twists 809 and 811. In addition, the original version of trajectory 803 ends at point 813, the original version of trajectory 805 ends at point 815, and the original version of trajectory 807 ends at point 817.

Figure 8C:
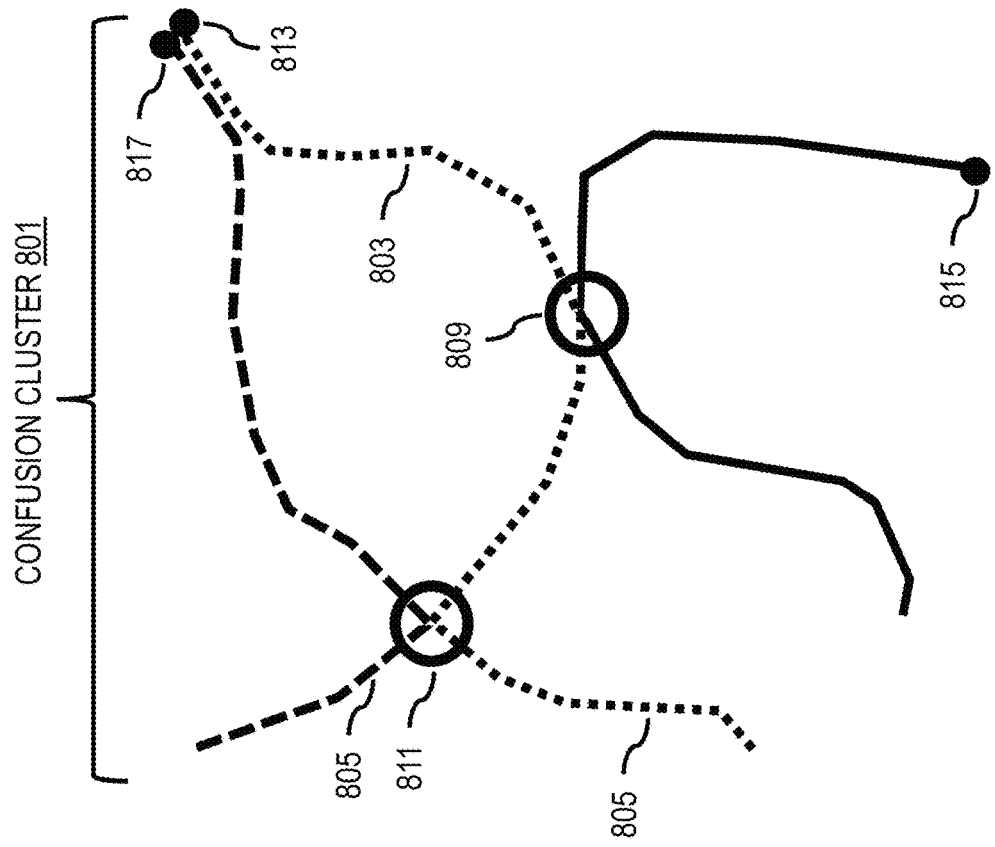

For each exchange twist in S (e.g., exchange twists 809 and 811), the anonymization module 303 can activate the exchange twists to swap the trajectory identifiers between subtrajectories of the trajectories 802-807 in the confusion cluster 801. For example, as shown in FIG. 8B, the portions of the trajectories 805 and 807 occurring after exchange switch 813 can be swapped so that trajectory 805 now ends at point 817 (instead of point 815) and trajectory 807 now ends at point 815 (instead of point 817). As shown in FIG. 8C, an additional swap at exchange twist 809 can be performed on top the swap that occurred at exchange twist 811 in FIG. 8B. For example, the once swapped trajectory 807 (ending at point 815) in FIG. 8B can be further swapped with the trajectory 801. So that the updated trajectory 807 now ends at point 813 (instead of point 815) and trajectory 801 now ends at point 815 (instead of point 813).

trajectories IDs at the twist are not swapped) or otherwise roll back the swap (e.g., the swap at exchange twist 809 as shown in FIG. 8C) so that trajectory 807 remains ending at point 815 and trajectory 803 remains ending at point 813.

Another situation in which executing a swap might reduce privacy is the case of a confusion cluster where two trajectories begin and/or end in the same, privacy-sensitive area (e.g., a user's home). In this case, the anonymization module 303 can avoid or otherwise ignore swapping the IDs of these two trajectories and instead swap each of these two trajectories with another trajectory that ends at a different location.

In one embodiment, the exchange twist algorithm can compare a privacy-sensitive feature of all trajectories in a confusion cluster, e.g. the starting and/or ending location, and find the set of exchange twists that, when activated, can maximize the difference in these features with respect to the original data.

In one embodiment, another way to leverage the dependence of twists in a cluster is to remove those twists that do not improve the privacy of the result. Reducing the number of swaps improves the plausibility of the output data, as each swap adds some inconsistencies in the output. For example, two vehicles that drive on the same congested highway for a long time will likely create a large number of twists, as they overtake one another in the traffic. These twists are not improving privacy as the vehicles are driving on the same highway and so no uncertainty would be added by swapping their IDs.

Figure 9A:
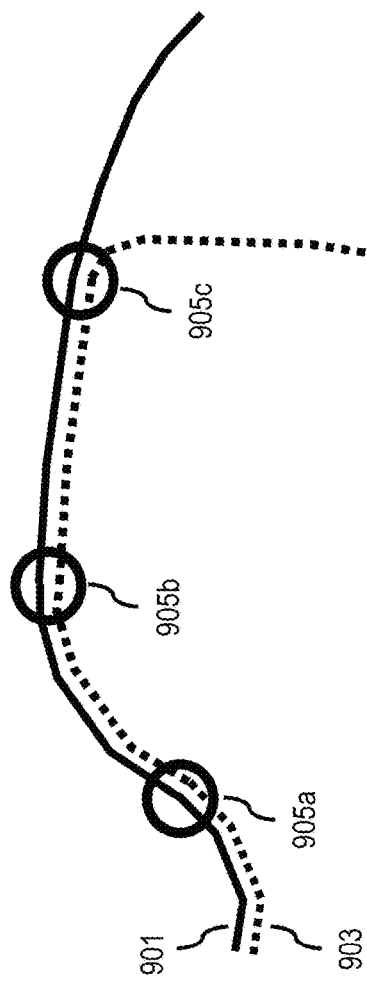
FIGS. 9A-9C illustrate an example of reducing the number swaps that do not improve privacy, according to one embodiment.
Figure 9B:
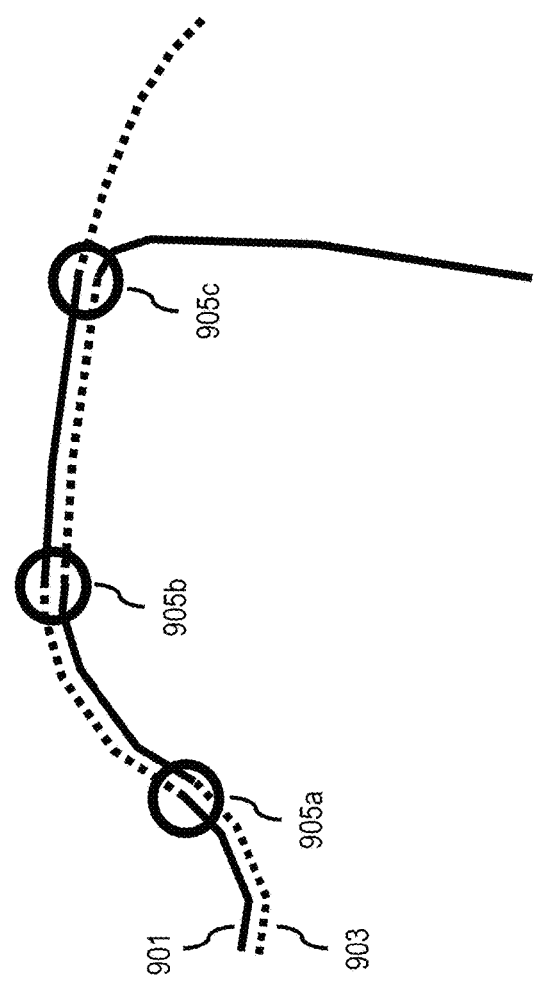
Figure 9C:
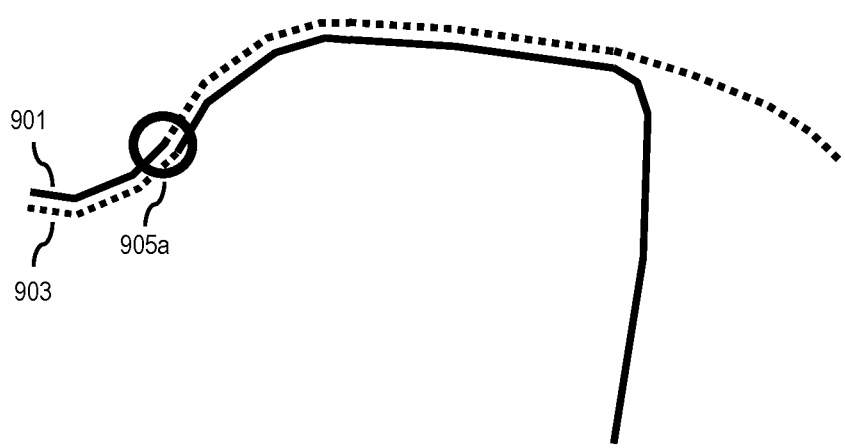

FIGS. 9A-9C illustrate an example of reducing the number swaps that do not improve privacy, according to one embodiment. As shown in FIG. 9A, a first trajectory 901 and a second trajectory 903 run parallel for a significant length. There are three identified exchange twists 905a-905c along the trajectories 901 and 903 as the two trajectories converge and diverge in space and time. As shown in FIG. 9B, swapping at each exchange twist 905a-905c may lead to excessive swapping without a corresponding increase in privacy when compared to minimizing the swap to one exchange twist 905a as shown in FIG. 9C. In other words, the three swaps performed in FIG. 9B results in trajectories having the same swapped destinations as the single swap in FIG. 9C. In this situation, the anonymization module 303 can use an algorithm to evaluate for each twist whether swapping the IDs would produce a difference in the trajectories, up to the next common twist, which is larger than a given threshold, provided a definition of similarity between trajectories. The anonymization module 303 would then execute the swap only if this condition is met (e.g., produce a difference or improvement in privacy). In other words, the anonymization module 303 can ignore the swapping of the one or more trajectory identifiers based on determining that the swapping results in no change of the plurality of trajectories up to a next exchange twist of the one or more exchange twists based on a spatial threshold, a temporal threshold, or a combination thereof.

In yet another embodiment, the anonymization module 303 can use a randomized response process to determine the probability of activating an exchange twist or not. In one embodiment, a randomized response is a survey technique that allows a user to respond to a question regarding a previously traveled trajectory (e.g., an original or an anonymized version of the trajectory) with plausible deniability, i.e., the reported answer is likely a product of a random process, while providing a truthful answer with high probability. In other words, the activation of exchange twists to generate anonymized trajectories can be determined based on a randomized response algorithm so that the anonymized data has a high probability of corresponding to the original data, which increases utility, and at the same time has a high probability of being the product of a random process, which provides plausible deniability (e.g., privacy).

Figure 10:
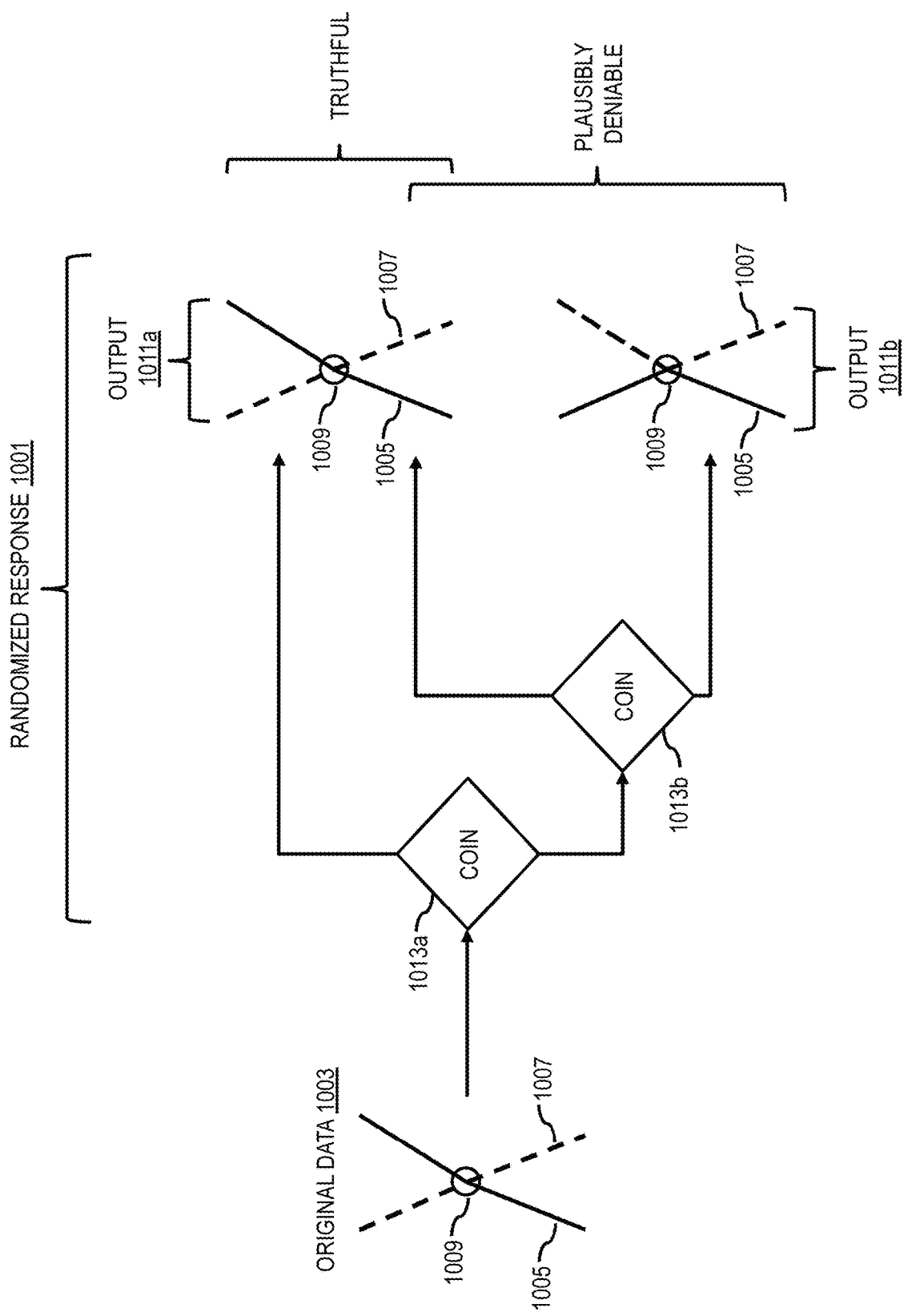
FIG. 10 illustrates an example of using a randomized response process 1001 for answering a location trajectory related binary question 1003, according to one embodiment.

FIG. 10 illustrates an example of using a randomized response process 1001 for anonymizing trajectory data using exchange twists, according to one embodiment. In this example, the original data 1003 (e.g., trajectory data to be anonymized) includes two trajectories 1005 and 1007 sharing an exchange twist 1009. The randomized response process 1001 swaps trajectory IDs of portions of the trajectories 1005 and 1007 based on the exchange twist 1009 to produce a randomly generated outcome (i.e., anonymized trajectory data). This randomly generated outcome offers plausible deniability (i.e., increased privacy) by returning either the truthful answer (e.g., output 1011a) or an artificially-generated answer (e.g., output 1011b), e.g., in which the portions of trajectories 1005 and 1007 are swapped to keep the true origins and destinations of the trajectories 1005 and 1005 private. In one embodiment, the randomized process 1001 includes multiple "coin tosses" 1013a-1013b (i.e., a randomized decision based on preset probabilities— e.g., 50/50 for a true coin toss) for randomly deciding between the two outputs 1011a and 1011b. The decision probabilities at each coin toss 1013a and 1013b can be specified to determine which one of the outputs 1011a-1011b is more likely to be selected.

In one embodiment, randomized response can be applied to trajectories by giving whole trajectories (e.g., trajectory data 109 and/or anonymized trajectory data 111) as input to the embodiments of the randomized response algorithm described above. The output of the randomized response process can then be used to determine which exchange twists to activate. For example, an exchange twist can be activated if the randomized response algorithm indicates that the probability of providing a truthful answer or having plausible deniability is above a threshold probability.

Following the selection and optimization of exchange twists described in the embodiments of phase two above, the third phase of the process 400 for trajectory anonymization using exchange twists involves initiating the swapping of one or more trajectory IDs among the plurality of location trajectories based on the one or more identified and/or activated exchange twists to generate anonymized trajectory data 111 (step 405). In other words, the third phase modifies the trajectory data 109 by swapping the IDs of trajectories at the exchange twists selected in the previous phase.

In one embodiment, the swapping of trajectory IDs can be performed as follows. For every exchange twist (Si, Sj) in E associated with the trajectory pair (Ti, Tj), the anonymization module 303 can:

(1) Find a pair of timestamp-ordered points $(s_1^{(i)}, s_2^{(i)})$, in $S_i$ and $(s_1^{(j)}, s_2^{(j)})$ in $S_j$
$t(s_1^{(i)}) < t(s_2^{(i)})$,
$t(s_1^{(j)}) < t(s_2^{(j)})$,
$t(s_1^{(i)}) < t(s_2^{(j)})$,
$t(s_1^{(j)}) < t(s_2^{(i)})$, where $t(s_k^{(m)})$ denotes the timestamp of the point $s_k^{(m)}$.

(2) Suppress the points in $T_i$ between $s_1^{(i)}$ and $s_2^{(i)}$, and the points in $T_j$ between $s_1^{(j)}$ and $s_2^{(j)}$ correspondingly.

(3) Switch the trajectory ID of every point in $T_i$ starting from $s_2^{(i)}$ (in time-stamp order) to the trajectory ID of $T_j$.

(4) Switch the trajectory ID of every point in $T_j$ starting from $s_2^{(j)}$ (in time-stamp order) to the trajectory ID of $T_i$.

In one embodiment, s1(i), s2(i), s1(j), and s2(j) are selected to preserve spatial consistency and/or the temporal consistency of the resulting trajectories. Consistency, for instance, refers to maintaining time gaps and/or distance gaps between swapped location data points that are within designated thresholds of surrounding location data points in the resulting anonymized trajectories. In particular, the first condition ensures time-consistency, but other conditions (such that the trajectory does not make a "jump" back along the road link, maintain consistent travel speed/acceleration, etc.) may apply too.

In step 407 of the process 400, the output module 305 can provide the anonymized subtrajectories (e.g., the anonymized trajectory data 111 using trajectory IDs swaps using exchange twists) as a trajectory anonymization output. By way of example, the anonymization output can be provided (e.g., transmitted/received over a communication network 127) to/from any authorized service or application requesting the data. As previously noted, these services and applications can include but are not limited to the mapping platform 121, services platform 115, services 117, content providers 119, or equivalent.

Returning to FIG. 1, in one embodiment, the mapping platform 121 of system 100 has access to the probe database 125 for storing the anonymized trajectory data 111 to provide LBS data 129. In one embodiment, the mapping platform 121 also has connectivity to a geographic database 113 to provide location-based services based on the trajectory data 109 and/or anonymized trajectory data 111. The mapping platform 121 can operate, for instance, in connection with the data provider platform 123 and/or probe devices 101 such as but not limited to one or more vehicles 103 and/or one or more UEs 105 (e.g., mobile devices) that can be carried by a user as a pedestrian or in a car (e.g., vehicle 103). Though depicted as automobiles, it is contemplated the vehicles 103 can be any type of transportation vehicle manned or unmanned (e.g., planes, aerial drone vehicles, motorcycles, boats, bicycles, etc.). Alternatively, the UE 105 may be a personal navigation device ("PND"), a cellular telephone, a mobile phone, a personal digital assistant ("PDA"), a watch, a camera, a computer and/or any other device that supports location-based services, e.g., digital routing and map display. It is contemplated that a device employed by a pedestrian may be interfaced with an on-board navigation system of a vehicle 103 or wirelessly/physically connected to the vehicle 103 to serve as the navigation system. Also, the UE 105 may be configured to access the communication network 127 by way of any known or still developing communication protocols to transmit and/or receive trajectory data 109 and/or anonymized trajectory data 111.

Also, the vehicle 103 and/or UE 105 may be configured with an application 107 for collecting probe data (e.g., trajectories) and/or for interacting with one or more data provider platforms 123, content providers 119, services 117 of a services platform 115, or a combination thereof. The application 107 may be any type of application that is executable on the vehicle 103 and/or UE 105, such as mapping applications, location-based service applications, navigation applications, content provisioning services, camera/imaging applications, media player applications, social networking applications, calendar applications, and the like. In one embodiment, the application 107 may act as a client for the data provider platform 123 and perform one or more functions of the data provider platform 123 alone or in combination with the data provider platform 123. In yet another embodiment, the content providers 119, services 117, and/or services platform 115 receive the location-based services and/or anonymized trajectory data 111 generated by the system 100 for executing its functions and/or services.

The vehicle 103 and/or UE 105 may be configured with various sensors (not shown for illustrative convenience) for acquiring and/or generating probe data associated with a vehicle 103, a driver, other vehicles, conditions regarding the driving environment or roadway, etc. For example, sensors may be used as GNSS/GPS receivers for interacting with one or more navigation satellites to determine and track the current speed, position and location of a vehicle traveling along a roadway. In addition, the sensors may gather other vehicle sensor data such as but not limited to tilt data (e.g., a degree of incline or decline of the vehicle during travel), motion data, light data, sound data, image data, weather data, temporal data and other data associated with the vehicles 103 and/or UEs 105. Still further, the sensors may detect local or transient network and/or wireless signals, such as those transmitted by nearby devices during navigation of a vehicle 103 along a roadway (Li-Fi, near field communication (NFC)) etc. This may include, for example, network routers configured within a premise (e.g., home or business), another UE 105 or vehicle 103 or a communications-capable traffic system (e.g., traffic lights, traffic cameras, traffic signals, digital signage, etc.).

It is noted therefore that the above described data may be transmitted via communication network 127 as probe data (e.g., trajectory data 109) according to any known wireless communication protocols. For example, each UE 105, mobile application 107, user, and/or vehicle 103 may be assigned a unique probe identifier (probe ID) or pseudonym for use in reporting or transmitting said trajectory data 109 collected by the vehicles 103 and UEs 105. In one embodiment, each vehicle 103 and/or UE 105 is configured to report probe data as probe points, which are individual data records collected at a point in time that records location data. Probes or probe points can be collected by the system 100 from the UEs 105, applications 107, and/or vehicles 103 in real-time, in batches, continuously, or at any other frequency requested by the system 100 over, for instance, the communication network 127 for processing by the data provider platform 123.

In one embodiment, the mapping platform 121 retrieves aggregated probe points gathered and/or generated by UE 105 resulting from the travel of UEs 105, and vehicles 103 on a road segment or other travel network (e.g., pedestrian paths, etc.). The probe database 125 stores a plurality of probe points and/or trajectories (e.g., trajectory data 109) generated by different UEs 105, applications 107, vehicles 103, etc. over a period of time. A time sequence of probe points specifies a trajectory—i.e., a path traversed by a UE 105, application 107, vehicles 103, etc. over a period of time.

In one embodiment, the communication network 127 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the data provider platform 123 and/or mapping platform 121 may be a platform with multiple interconnected components. The data provider platform 123 and/or mapping platform 121 may include multiple servers, intelligent networking devices, computing devices, components, and corresponding software for minding pedestrian and/or vehicle specific probe data from mix-mode probe data. In addition, it is noted that the data provider platform 123 and/or mapping platform 121 may be a separate entity of the system 100, a part of the one or more services 117 of the services platform 115, or included within the UE 105 (e.g., as part of the applications 107).

In one embodiment, the content providers 119 may provide content or data (e.g., probe data) to the components of the system 100. The content provided may be any type of content, such as probe data (e.g., trajectory data 109 and/or anonymized trajectory data 111), location data, textual content, audio content, video content, image content, etc. In one embodiment, the content providers 119 may also store content associated with the vehicles 103, the UE 105, the mapping platform 121, and/or the services 117. In another embodiment, the content providers 119 may manage access to a central repository of data, and offer a consistent, standard interface to data, such as a trajectories database, a repository of probe data, average travel times for one or more road links or travel routes (e.g., during free flow periods, day time periods, rush hour periods, nighttime periods, or a combination thereof), speed information for at least one vehicle, other traffic information, etc. Any known or still developing methods, techniques, or processes for retrieving and/or accessing trajectory or probe data from one or more sources may be employed by the mapping platform 121.

By way of example, the UE 105, application 107, vehicles 103, data provider platform 123, and/or mapping platform 121 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
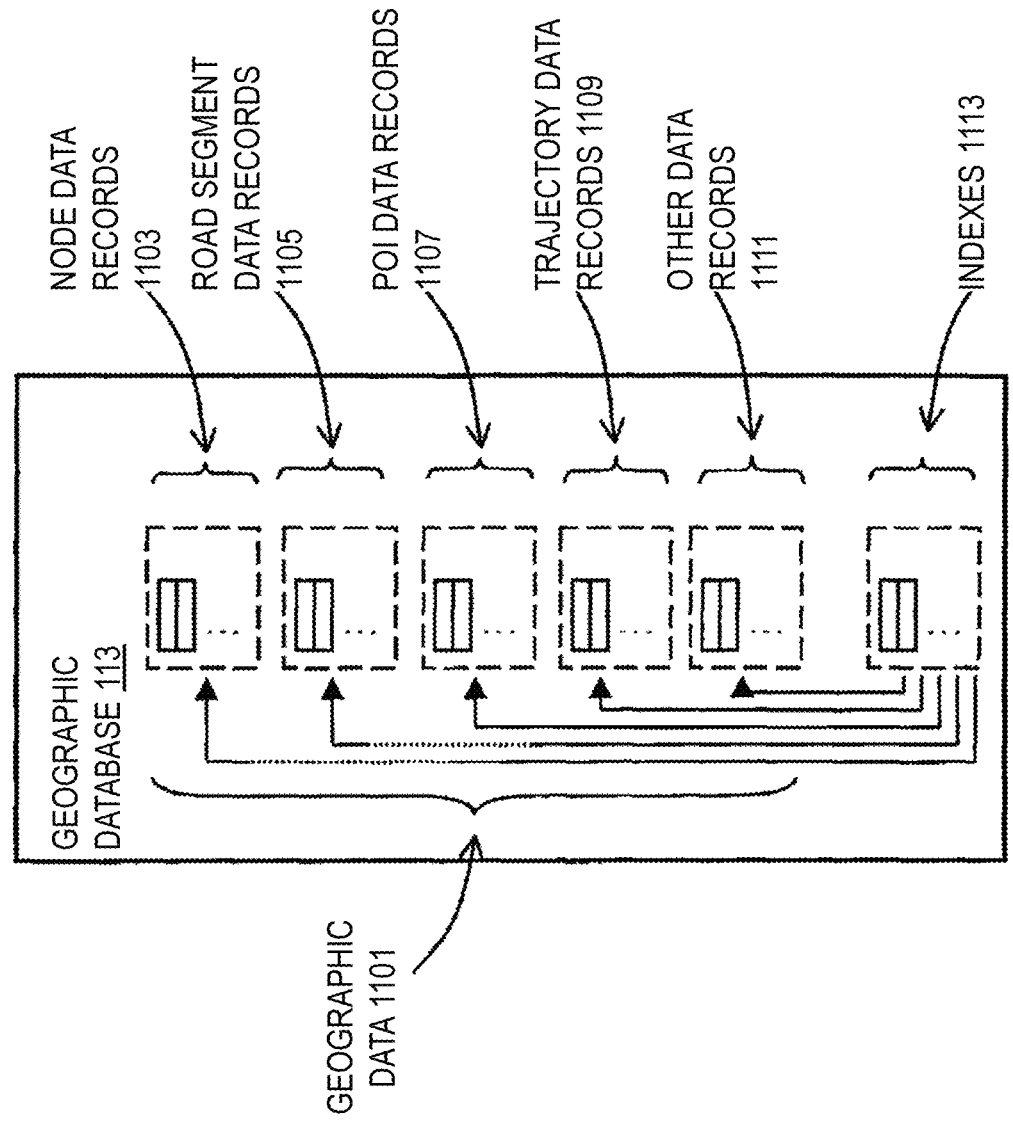
FIG. 11 is a diagram of geographic database, according to one embodiment.

FIG. 11 is a diagram of the geographic database 113 of system 100, according to exemplary embodiments. In the exemplary embodiments, modal routes, trajectories (sequences of probe points), road segments, lane model information and/or other related information can be stored, associated with, and/or linked to the geographic database 113 or data thereof. In one embodiment, the geographic database 113 includes geographic data 1101 used for (or configured to be compiled to be used for) mapping and/or navigation-related services, such as for personalized route determination, according to exemplary embodiments. For example, the geographic database 113 includes node data records 1103, road segment or link data records 1105, POI data records 1107, trajectory data records 1109, and other data records 1111. More, fewer, or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques).

In exemplary embodiments, the road segment data records 1105 are links or segments representing roads, streets, or paths, as can be used in the calculated route or recorded route information for determination of one or more personalized routes, according to exemplary embodiments. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1107. The geographic database 113 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In addition, the geographic database 113 can include trajectory data records 1109 for storing trajectory data 109, anonymized trajectory data 111, and/or any other related data used in the embodiments of trajectory anonymization using negative gaps described herein.

The geographic database 113 can be maintained by the content provider 119 in association with the services platform 115 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 105. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., vehicle 103, UE 105, etc.) to provide navigation-related functions (e.g., functions based on anonymized trajectory data 111). For example, the geographic database 113 can be used with the end user device to provide an end user with navigation features. In such a case, the geographic database 113 can be downloaded or stored on the end user device (e.g., vehicle 103, UE 105, etc.), such as in application 107, or the end user device can access the geographic database 113 through a wireless or wired connection (such as via a server and/or the communication network 127), for example.

The processes described herein for providing trajectory anonymization based on exchange twists may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
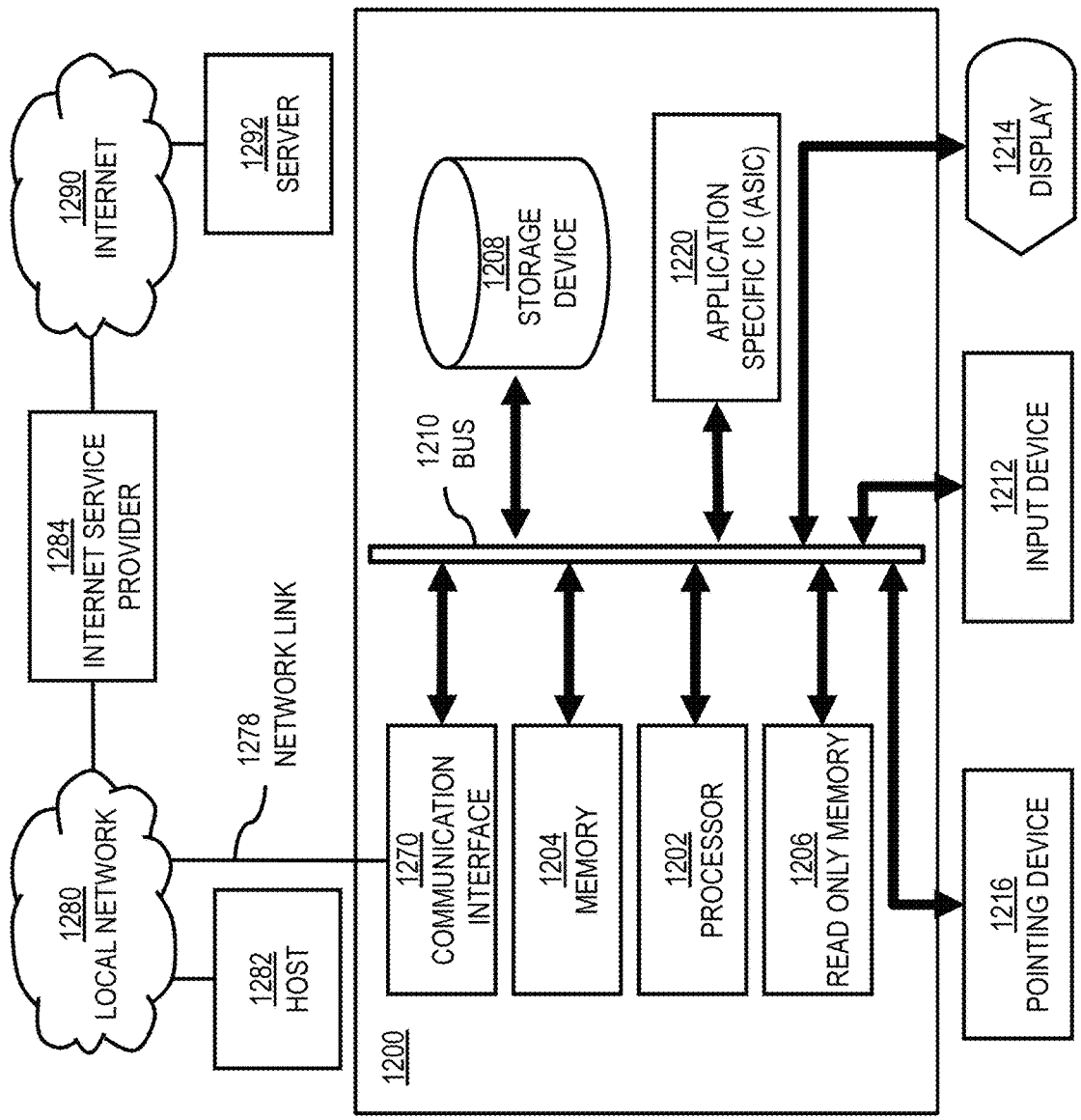
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to provide trajectory anonymization based on exchange twists as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing trajectory anonymization based on exchange twists. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing trajectory anonymization based on exchange twists. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing trajectory anonymization based on exchange twists, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners, and external disks. In general, the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic, or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 127 for providing trajectory anonymization based on exchange twists.

The term computer-readable medium is used herein to refer to any medium that participates in providing information to processor 1202, including instructions for execution. Such a medium may take many forms, including, but not limited to, non-volatile media, volatile media, and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system can be deployed in various configurations within other computer systems, e.g., host 1282 and server 1292.

FIG. 13 illustrates a chip set 1300 upon which an embodiment of the invention may be implemented. Chip set 1300 is programmed to provide trajectory anonymization based on exchange twists as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide trajectory anonymization based on exchange twists. The memory 1305 also stores the data associated with or generated by the execution of the inventive steps.

FIG. 14 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide trajectory anonymization based on exchange twists. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
processing, by a processor, a plurality of location trajectories to determine one or more exchange twists, wherein the plurality of location trajectories are respectively a sequence of locations points determined by a location sensor of a device, and wherein the one or more exchange twists are one or more locations at which at least two trajectories of the plurality of location trajectories match based on a matching criterion;
initiating a swapping of one or more trajectory identifiers among the plurality of location trajectories based on the one or more exchange twists to generate anonymized trajectory data;
designating the plurality of location trajectories as a confusion cluster based on determining that each location trajectory of the plurality of location trajectories have the one or more exchange twists in common, wherein the anonymized trajectory data is generated for the confusion cluster, and wherein the swapping of the one or more trajectory identifiers is performed in parallel with a processing of another confusion cluster of a plurality of other location trajectories; and
providing the anonymized trajectory data as an output to a location-based service.

2. The method of claim 1, wherein the matching criterion is based on determining that a first location point in a first trajectory of the plurality of trajectories is within a spatial threshold, a temporal threshold, or a combination thereof of a second location point in a second trajectory of the plurality of location trajectories.

3. The method of claim 1, further comprising:
selecting a subset of the one or more exchange twists to activate,
wherein the swapping is based on the activated subset.

4. The method of claim 3, wherein the selecting of the subset of the one or more exchange twists to activate is further based on a randomized response process.

5. The method of claim 1, further comprising:
ignoring the swapping of the one or more trajectory identifiers based on determining that the swapping that does not increase privacy of the anonymized trajectory data based on a privacy metric.

6. The method of claim 5, wherein the privacy metric is based on a change of an origin, a destination, or a combination thereof of at least one trajectory of the plurality of location trajectories.

7. The method of claim 1, further comprising:
ignoring the swapping of the one or more trajectory identifiers based on determining that the swapping will cause a first trajectory and a second trajectory of the plurality of location trajectories to begin, to end, or a combination thereof at a common privacy-sensitive area.

8. The method of claim 1, further comprising:
ignoring the swapping of the one or more trajectory identifiers based on determining that the swapping results in no change of the plurality of trajectories up to a next exchange twist of the one or more exchange twists based on a spatial threshold, a temporal threshold, or a combination thereof.

9. The method of claim 1, further comprising:
ignoring the swapping of the one or more trajectory identifiers based on determining that the swapping is not consistent with corresponding map data.

10. The method of claim 1, wherein the swapping further comprises preserving a spatial consistency, a temporal consistency, or a combination thereof of the anonymized trajectory data.

11. The method of claim 1, wherein the swapping further comprises avoiding the anonymized trajectory data from indicating an inconsistent maneuver, an inconsistent movement characteristic, or a combination thereof.

12. An apparatus comprising:
at least one processor; and
at least one memory including computer program code for one or more programs,
the at least one memory and the computer program code configured to, with the at least one processor, cause the apparatus to perform at least the following,
process a plurality of location trajectories to determine one or more exchange twists, wherein the plurality of location trajectories are respectively a sequence of locations points determined by a location sensor of a device, and wherein the one or more exchange twists are one or more locations at which at least two trajectories of the plurality of location trajectories match based on a matching criterion;
initiate a swapping of one or more trajectory identifiers among the plurality of location trajectories based on the one or more exchange twists to generate anonymized trajectory data
designate the plurality of location trajectories as a confusion cluster based on determining that each location trajectory of the plurality of location trajectories have the one or more exchange twists in common, wherein the anonymized trajectory data is generated for the confusion cluster, and wherein the swapping of the one or more trajectory identifiers is performed in parallel with a processing of another confusion cluster of a plurality of other location trajectories; and
provide the anonymized trajectory data as an output to a location-based service.

13. The apparatus of claim 12, wherein the matching criterion is based on determining that a first location point in a first trajectory of the plurality of trajectories is within a spatial threshold, a temporal threshold, or a combination thereof of second location point in a second trajectory of the plurality of location trajectories.

14. A non-transitory computer readable storage medium including one or more sequences of one or more instructions which, when executed by one or more processors, cause an apparatus to at least perform:

processing, by a processor, a plurality of location trajectories to determine one or more exchange twists, wherein the plurality of location trajectories are respectively a sequence of locations points determined by a location sensor of a device, and wherein the one or more exchange twists are one or more locations at which at least two trajectories of the plurality of location trajectories match based on a matching criterion;

initiating a swapping of one or more trajectory identifiers among the plurality of location trajectories based on the one or more exchange twists to generate anonymized trajectory data;

designating the plurality of location trajectories as a confusion cluster based on determining that each location trajectory of the plurality of location trajectories have the one or more exchange twists in common, wherein the anonymized trajectory data is generated for the confusion cluster, and wherein the swapping of the one or more trajectory identifiers is performed in parallel with a processing of another confusion cluster of a plurality of other location trajectories; and providing the anonymized trajectory data as an output to a location-based service.

* * * * *